US010882956B2

(12) United States Patent
Grieshaber et al.

(10) Patent No.: US 10,882,956 B2
(45) Date of Patent: Jan. 5, 2021

(54) POLYETHERIMIDE COMPOSITION AND ASSOCIATED ARTICLE AND ADDITIVE MANUFACTURING METHOD

(71) Applicant: SABIC GLOBAL TECHNOLOGIES B.V., Bergen op Zoom (NL)

(72) Inventors: Sarah E. Grieshaber, Selkirk, NY (US); Malvika Bihari, Mount Vernon, IN (US); Kelly Leung, Mount Vernon, IN (US); Vikram K. Daga, Mount Vernon, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 42 days.

(21) Appl. No.: 16/327,108

(22) PCT Filed: Nov. 27, 2017

(86) PCT No.: PCT/US2017/063268
§ 371 (c)(1),
(2) Date: Feb. 21, 2019

(87) PCT Pub. No.: WO2018/106464
PCT Pub. Date: Jun. 14, 2018

(65) Prior Publication Data
US 2020/0377657 A1 Dec. 3, 2020

Related U.S. Application Data

(60) Provisional application No. 62/432,461, filed on Dec. 9, 2016.

(51) Int. Cl.
*C08G 73/10* (2006.01)
*C08G 77/448* (2006.01)
(Continued)

(52) U.S. Cl.
CPC ..... *C08G 73/1046* (2013.01); *C08G 73/1071* (2013.01); *C08G 77/14* (2013.01);
(Continued)

(58) Field of Classification Search
CPC ............ C08G 73/1046; C08G 73/1071; C08G 77/442; C08G 77/448; C08L 69/005
See application file for complete search history.

(56) References Cited

U.S. PATENT DOCUMENTS 2,891,920 A   6/1959  Hyde et al.
3,294,725 A   12/1966 Findlay et al.
(Continued)

FOREIGN PATENT DOCUMENTS

EP         0502480 A2     9/1992
WO      2016164518 A1    10/2016
WO   WO-2016164518 A1 * 10/2016  ............... C08L 79/08

OTHER PUBLICATIONS

International Preliminary Report on Patentability dated Oct. 25, 2018; International Application No. PCT/US2017/063268; International Filing Date Nov. 27, 2017 (15 page).
(Continued)

*Primary Examiner* — Vu A Nguyen
(74) *Attorney, Agent, or Firm* — Cantor Colburn LLP

(57) ABSTRACT

A polyetherimide composition includes specific amounts of a polyetherimide, a block polyestercarbonate, a block polycarbonate-polysiloxane, and a core-shell impact modifier in which the core includes a polysiloxane and the shell includes a poly(alkyl (meth)acrylate). Relative to a corresponding composition lacking the core-shell impact modifier, the polyetherimide composition exhibits increased impact strength while substantially retaining flame retardancy. Also
(Continued)

described are associated articles, including articles formed by additive manufacturing, and a method of additive manufacturing.

20 Claims, 2 Drawing Sheets

(51) Int. Cl.
  *C08G 77/442* (2006.01)
  *C08L 69/00* (2006.01)
  *C08K 5/5399* (2006.01)
  *C08G 77/14* (2006.01)

(52) U.S. Cl.
  CPC .......... *C08G 77/448* (2013.01); *C08K 5/5399* (2013.01); *C08L 69/005* (2013.01); *C08L 2205/035* (2013.01); *C08L 2205/16* (2013.01); *C08L 2207/53* (2013.01)

(56) References Cited

U.S. PATENT DOCUMENTS

| | | | |
|---|---|---|---|
| 3,419,634 A | 12/1968 | Vaughn | |
| 3,419,635 A | 12/1968 | Vaughn | |
| 3,821,325 A | 6/1974 | Merritt, Jr. et al. | |
| 3,832,419 A | 8/1974 | Merritt, Jr. | |
| 3,847,867 A | 11/1974 | Heath et al. | |
| 3,850,885 A | 11/1974 | Takekoshi et al. | |
| 3,852,242 A | 12/1974 | White | |
| 3,855,178 A | 12/1974 | White et al. | |
| 3,983,093 A | 9/1976 | Williams, III et al. | |
| 4,404,350 A | 9/1983 | Ryang | |
| 4,443,591 A | 4/1984 | Schmidt et al. | |
| 4,690,997 A | 9/1987 | Cella et al. | |
| 4,808,686 A | 2/1989 | Cella et al. | |
| 6,072,011 A | 6/2000 | Hoover | |
| 6,153,694 A | 11/2000 | Miyatake et al. | |
| 7,790,292 B2 | 9/2010 | Colborn et al. | |
| 2008/0242797 A1 | 10/2008 | Saegusa et al. | |
| 2016/0326366 A1* | 11/2016 | Sybert | C08L 69/00 |

OTHER PUBLICATIONS

International Search Report dated Feb. 12, 2018; International Application No. PCT/US2017/063268; International Filing Date Nov. 27, 2017 (5 pgs).

Ederson, D. M., "Flammability Requirements for Aircraft Seat Cushions", U.S. Federal Aviation Adminstration advisory Circular 25.853-1, Sep. 17, 1986 (10 pgs).

Written Opinion dated Feb. 12, 2018; International Application No. PCT/U52017/063268; International Filing Date Nov. 27, 2017 (5 pgs).

* cited by examiner

POLYETHERIMIDE COMPOSITION AND ASSOCIATED ARTICLE AND ADDITIVE MANUFACTURING METHOD

CROSS-REFERENCE TO RELATED APPLICATIONS

This application is a National Stage application of PCT/US2017/063268, filed Nov. 27, 2017, which claims the benefit of U.S. Provisional Application No. 62/432,461, filed Dec. 9, 2016, both of which are incorporated by reference herein in their entirety.

BACKGROUND

Polyetherimide has become a preferred material for use in additive manufacturing because of its high heat resistance and flame resistance. However, the impact strength of parts made by additive manufacturing may be inadequate for some applications. Specifically, the impact strengths values of such parts can be about half those for injection molded parts made from the same polyetherimide composition. A known strategy for increasing the impact strength of a thermoplastic composition is to add an impact modifier. However, addition of impact modifiers to polyetherimide compositions often results in substantial degradation of their flame retardancy. Accordingly, there is a need for a polyetherimide composition that provides three-dimensional printed parts with significantly improved impact strength without substantially compromising flame retardancy.

SUMMARY

The present inventors have determined that significant improvements in impact strength with substantial preservation of flame retardancy are provided by a polyetherimide composition containing specific amounts of a polyetherimide, a block polyestercarbonate, a block polycarbonate-polysiloxane, and a core-shell impact modifier in which the core includes a polysiloxane and the shell includes a poly(alkyl (meth)acrylate).

One embodiment is composition, comprising, based on the total weight of the composition: 40 to 60 weight percent of a polyetherimide; 15 to 50 weight percent of a block polyestercarbonate comprising a polyester block comprising resorcinol ester repeat units having the structure

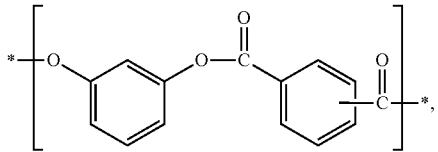

and
a polycarbonate block comprising carbonate repeat units having the structure

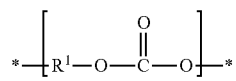

wherein at least 60 percent of the total number of $R^1$ groups are aromatic; 5 to 15 weight percent of a block polycarbonate-polysiloxane; and 1.5 to 7 weight percent of a core-shell impact modifier comprising, based on the weight of the core-shell impact modifier, 60 to 95 weight percent of a core comprising a polysiloxane, and 5 to 40 weight percent of a shell comprising a poly(alkyl (meth)acrylate); wherein the composition comprises 0 to 0.8 weight percent of polystyrene-poly(ethylene-butylene)-polystyrene block copolymers.

Another embodiment is an article comprising the composition.

Another embodiment is a method of additive manufacturing, the method comprising: melt extruding a molten composition to form a plurality of adjacent layers in a predetermined pattern; wherein the molten composition is characterized by a glass transition temperature; wherein the molten composition has a temperature 5 to 250° C. greater than the glass transition temperature of the molten composition; and wherein the molten composition comprises, based on the total weight of the composition: 40 to 60 weight percent of a polyetherimide; 15 to 50 weight percent of a block polyestercarbonate comprising a polyester block comprising resorcinol ester repeat units having the structure

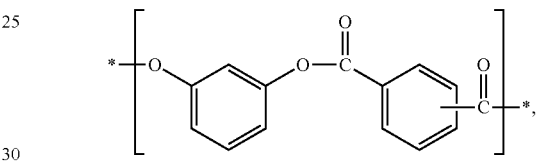

and
a polycarbonate block comprising carbonate repeat units having the structure

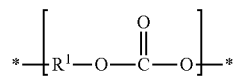

wherein at least 60 percent of the total number of $R^1$ groups are aromatic; 5 to 15 weight percent of a block polycarbonate-polysiloxane; and 1.5 to 7 weight percent of a core-shell impact modifier comprising, based on the weight of the core-shell impact modifier, 60 to 95 weight percent of a core comprising a polysiloxane, and 5 to 40 weight percent of a shell comprising a poly(alkyl (meth)acrylate); wherein the composition comprises 0 to 0.8 weight percent of polystyrene-poly(ethylene-butylene)-polystyrene block copolymers.

Another embodiment is a use of a composition as a melt extruded material for additive manufacturing, the composition comprising, based on the total weight of the composition: 40 to 60 weight percent of a polyetherimide; 15 to 50 weight percent of a block polyestercarbonate comprising a polyester block comprising resorcinol ester repeat units having the structure

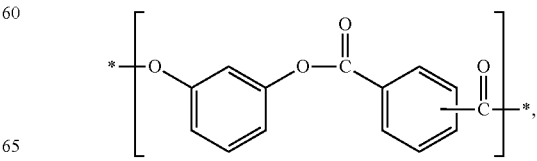

and
a polycarbonate block comprising carbonate repeat units having the structure

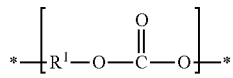

wherein at least 60 percent of the total number of $R^1$ groups are aromatic; 5 to 15 weight percent of a block polycarbonate-polysiloxane; and 1.5 to 7 weight percent of a core-shell impact modifier comprising, based on the weight of the core-shell impact modifier, 60 to 95 weight percent of a core comprising a polysiloxane, and 5 to 40 weight percent of a shell comprising a poly(alkyl (meth)acrylate); wherein the composition comprises 0 to 0.8 weight percent of polystyrene-poly(ethylene-butylene)-polystyrene block copolymers.

These and other embodiments are described in detail below.

DETAILED DESCRIPTION

Figure 1:
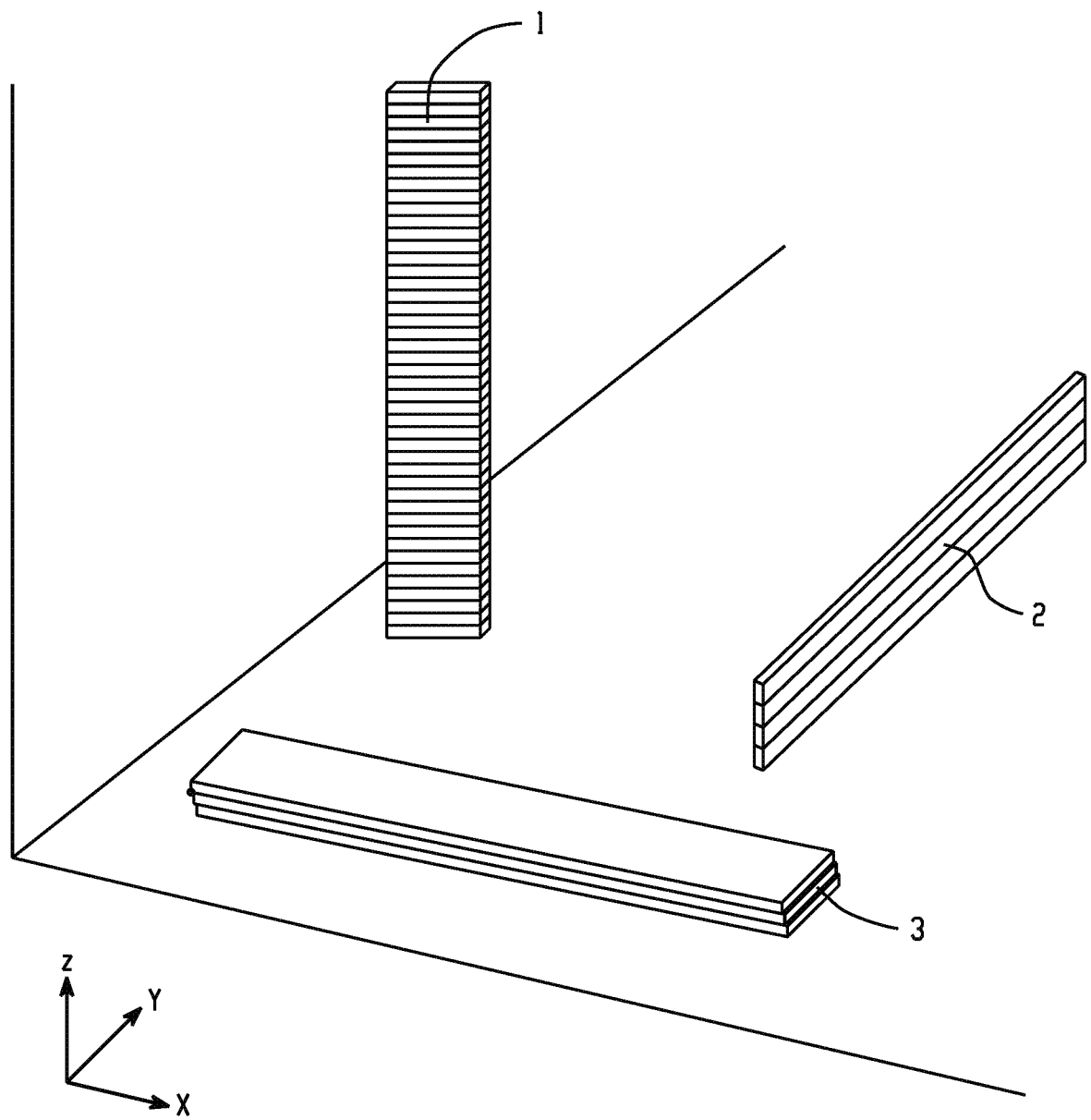
FIG. 1 is a diagram of print (layer) orientations for exemplary test articles useful for determining tensile properties and Izod impact strengths.

One embodiment is composition, comprising, based on the total weight of the composition: 40 to 60 weight percent of a polyetherimide; 15 to 50 weight percent of a block polyestercarbonate comprising a polyester block comprising resorcinol ester repeat units having the structure

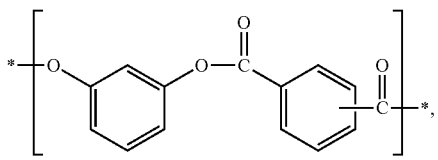

and
a polycarbonate block comprising carbonate repeat units having the structure

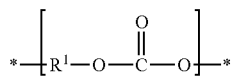

wherein at least 60 percent of the total number of $R^1$ groups are aromatic; 5 to 15 weight percent of a block polycarbonate-polysiloxane; and 1.5 to 7 weight percent of a core-shell impact modifier comprising, based on the weight of the core-shell impact modifier, 60 to 95 weight percent of a core comprising a polysiloxane, and 5 to 40 weight percent of a shell comprising a poly(alkyl (meth)acrylate); wherein the composition comprises 0 to 0.8 weight percent of polystyrene-poly(ethylene-butylene)-polystyrene block copolymers.

The composition comprises a polyetherimide. Polyetherimides comprise repeat units having the formula

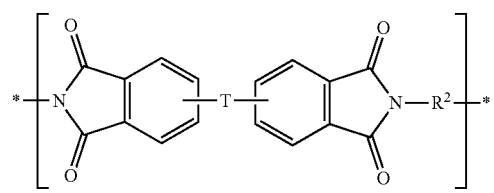

wherein T is —O— or a group of the Formula —O—Z—O— wherein the divalent bonds of the —O— or the —O—Z—O— group are in the 3,3', 3,4', 4,3', or the 4,4' positions of the phthalimide groups; Z includes divalent moieties of the formula

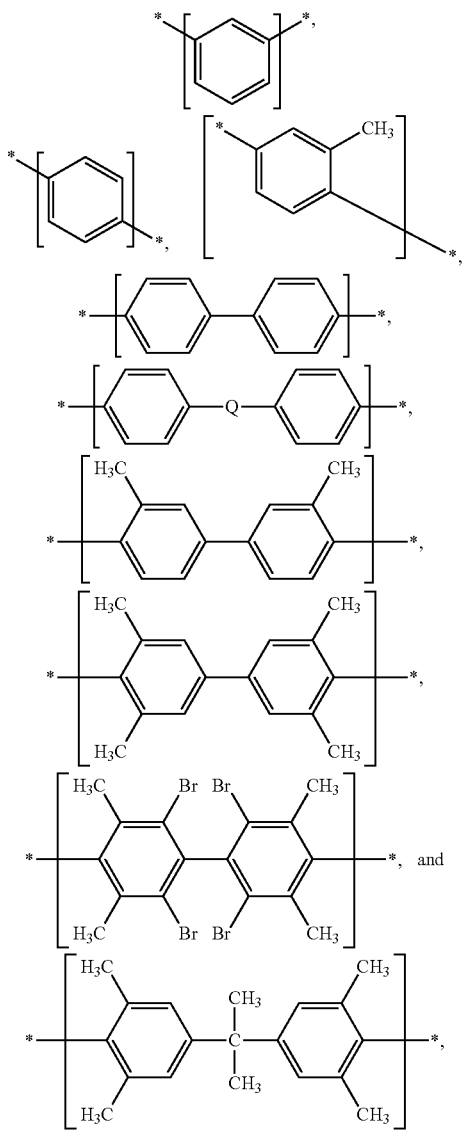

wherein Q is a divalent moiety that can be —O—, —S—, —C(O)—, —SO$_2$—, —SO—, —C$_y$H$_{2y}$— wherein y is 1 to 8, or —C$_p$H$_q$F$_r$— wherein p is 1 to 8 and q is 0 to 15 and r is 1 to 16 and q+r=2p; and $R^2$ is independently at each occurrence a divalent group selected from the group consisting of substituted or unsubstituted divalent aromatic hydrocarbon moieties having 6 to 20 carbons, straight or branched chain alkylene moieties having 2 to 20 carbons, cycloalkylene moieties having 3 to 20 carbon atom, and divalent moieties of the general formula

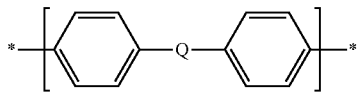

wherein Q is defined above. As used herein, "substituted" means including at least one substituent such as a halogen (i.e., F, Cl, Br, I), hydroxyl, amino, thiol, carboxyl, carboxylate, amide, nitrile, sulfide, disulfide, nitro, $C_1$-$C_{18}$ alkyl, $C_1$-$C_{18}$ alkoxyl, $C_6$-$C_{18}$ aryl, $C_6$-$C_{18}$ aryloxyl, $C_7$-$C_{18}$ alkylaryl, or $C_7$-$C_{18}$alkylaryloxyl. So, when the hydrocarbyl residue is described as substituted, it can contain heteroatoms in addition to carbon and hydrogen.

In some embodiments, each occurrence of $R^2$ is independently para-phenylene or meta-phenylene, and T is a divalent moiety of the formula

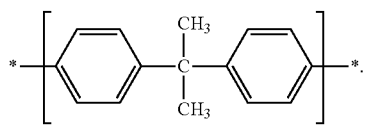

In some embodiments, the polyetherimide is free of halogens. The number of repeat units in the polyetherimide can be, for example, 10 to 1,000, or 10 to 500.

In some embodiments, the polyetherimide comprises 10 to 1000 repeat units, each repeat unit independently having the structure

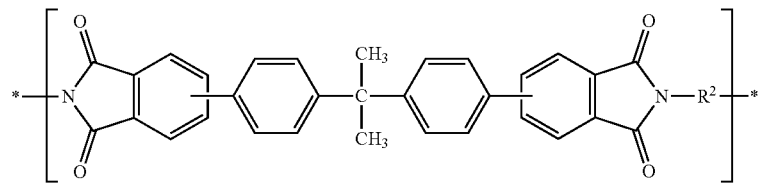

wherein $R^2$ is meta-phenylene or para-phenylene.

Included among the many methods of making polyetherimides are those disclosed in U.S. Pat. No. 3,847,867 to Heath et al., U.S. Pat. No. 3,850,885 to Takekoshi et al., U.S. Pat. Nos. 3,852,242 and 3,855,178 to White, U.S. Pat. No. 3,983,093 to Williams et al., and U.S. Pat. No. 4,443,591 to Schmidt et al. Polyetherimides are also commercially available as, for example, ULTEM™ resins from SABIC.

In some embodiments, the composition comprises the polyetherimide in an amount of 15 to 25 weight percent, based on the total weight of the composition.

In some embodiments, the composition comprises the polyetherimide in an amount of 40 to 60 weight percent, based on the total weight of the composition. Within this range, the polyetherimide amount can be 40 to 55 weight percent, or 45 to 55 weight percent.

In addition to the polyetherimide, the composition comprises a block polyestercarbonate, sometimes referred to herein as a polycarbonate-ester polymer. The block polyestercarbonate comprises a polyester block comprising resorcinol ester repeat units having the structure

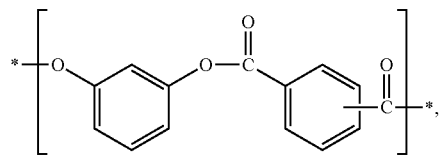

and
a polycarbonate block comprising carbonate repeat units having the structure

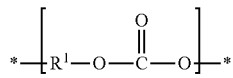

wherein at least 60 mole percent of the total number of $R^1$ groups are aromatic divalent groups. In some embodiments, the aromatic divalent groups are $C_6$-$C_{24}$ aromatic divalent groups. When not all $R^1$ groups are aromatic, the remainder are $C_2$-$C_{24}$ aliphatic divalent groups. In some embodiments, each $R^1$ is a radical of the formula

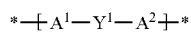

wherein each of $A^1$ and $A^2$ is independently a monocyclic divalent aryl radical and $Y^1$ is a bridging radical having one or two atoms that separate $A^1$ from $A^2$. In some embodiments, one atom separates $A^1$ from $A^2$. Illustrative non-limiting examples of radicals of this type are —O—, —S—, —S(O)—, —S(O)$_2$-, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a $C_1$-$C_{12}$ (divalent) hydrocarbylene group. As used herein, the term "hydrocarbyl", whether used by itself, or as a prefix, suffix, or fragment of another term, refers to a residue that contains only carbon and hydrogen unless it is specifically identified as "substituted hydrocarbyl". The hydrocarbyl residue can be aliphatic or aromatic, straight-chain, cyclic, branched, saturated, or unsaturated. It can also contain combinations of aliphatic, aromatic, straight chain, cyclic, bicyclic, branched, saturated, and unsaturated hydrocarbon moieties. When the hydrocarbyl residue is described as substituted, it can contain heteroatoms in addition to carbon and hydrogen. Examples of $Y^1$ include methylene (—CH$_2$—; also known as methylidene), ethylidene (—CH(CH$_3$)—), isopropylidene (—C(CH$_3$)$_2$—), and cyclohexylidene.

In some embodiments, the polyester block comprises resorcinol ester repeat units having the structures

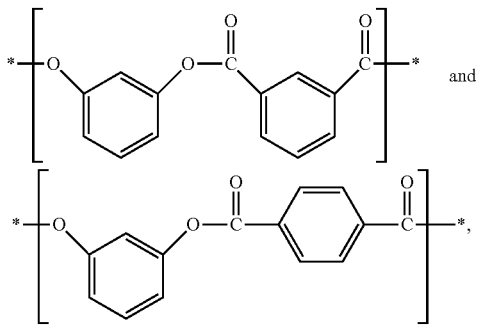

and the polycarbonate block comprises bisphenol A carbonate repeat units having the structure

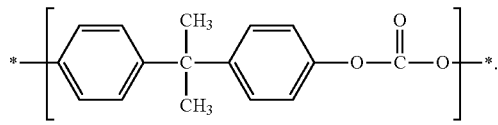

In some embodiments, the block polyestercarbonate comprises, based on the total moles of repeat units in the block polyestercarbonate, 5 to 95 mole percent of ester repeat units, and 5 to 95 mole percent of carbonate repeat units. Within these ranges, the mole percent of ester repeat units can be 50 to 90, and the mole percent of carbonate repeat units can be 10 to 50 mole percent; or the mole percent of ester repeat units can be 70 to 90, and the mole percent of carbonate repeat units can be 10 to 30 mole percent. In a very specific embodiment, the block polyestercarbonate comprises 70 to 90 mole percent of resorcinol isophthalate/terephthalate repeat units, 5 to 15 mole percent of resorcinol carbonate repeat units, and 5 to 15 mole percent of bisphenol A carbonate repeat units.

In some embodiments, the block polyestercarbonate has a weight average molecular weight of 5,000 to 100,000 grams/mole, as determined by gel permeation chromatography (GPC), using a crosslinked styrene-divinylbenzene column and polycarbonate standards. Within this range, the weight average molecular weight can be 10,000 to 50,000 grams/mole, or 10,000 to 40,000 grams/mole.

Methods of making block polyestercarbonates are known and include those disclosed in U.S. Pat. No. 7,790,292 B2 to Colborn et al.

The composition comprises the block polyestercarbonate in an amount of 15 to 50 weight percent, based on the total weight of the composition. Within this range, the block polyestercarbonate amount can be 15 to 40 weight percent, or 15 to 30 weight percent.

In addition to the polyetherimide and the block polyestercarbonate the composition comprises a block polycarbonate-polysiloxane, sometimes referred to herein as a polycarbonate-siloxane polymer. A block polycarbonate-polysiloxane is a polycarbonate copolymer comprising at least one polycarbonate block and at least one polysiloxane block. In some embodiments, the block polycarbonate-polysiloxane comprises multiple polycarbonate blocks and multiple polysiloxane blocks. The block polycarbonate-polysiloxane can be transparent, translucent, or opaque, depending on its composition.

The at least one polycarbonate block of the block polycarbonate-polysiloxane comprises carbonate repeat units of the formula

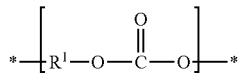

wherein at least 60 mole percent of the total number of $R^1$ groups are aromatic divalent groups. In some embodiments, the aromatic divalent groups are $C_6$-$C_{24}$ aromatic divalent groups. When not all $R^1$ groups are aromatic divalent groups, the remainder are $C_2$-$C_{24}$ aliphatic divalent groups. In some embodiments, each $R^1$ is a radical of the formula

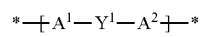

wherein $A^1$, $A^2$, and $Y^1$ are defined as above. In a specific embodiment, the polycarbonate block comprises bisphenol A carbonate repeat units.

In some embodiments, each of the at least one polysiloxane blocks of the copolymer comprises diorganosiloxane units of the formula

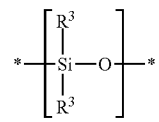

wherein each occurrence of $R^3$ is independently $C_{1-13}$ hydrocarbyl. Examples of suitable hydrocarbyl groups include $C_1$-$C_{13}$ alkyl (including alkyl groups that are linear, branched, cyclic, or a combination of at least two of the foregoing), $C_2$-$C_{13}$ alkenyl, $C_6$-$C_{12}$aryl $C_7$-$C_{13}$ arylalkyl, and $C_7$-$C_{13}$ alkylaryl. The foregoing hydrocarbyl groups can, optionally, be fully or partially halogenated with fluorine, chlorine, bromine, iodine, or a combination of at least two of the foregoing. In some embodiments, including some embodiments in which a transparent block polycarbonate-polysiloxane is desired, $R^3$ is halogen-free.

The polysiloxane blocks can each comprise 2 to 1,000 diorganosiloxane units. Within this range, the number of diorganosiloxane units can be 2 to 500, more specifically 5 to 100. In some embodiments, the number of diorganosiloxane repeat units in each block is 10 to 75, specifically 40 to 60.

In some embodiments, the polysiloxane block has the formula

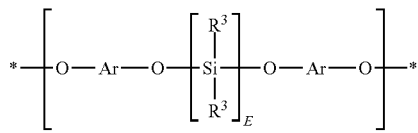

wherein R³ is defined above; E is 2 to 1,000, or 2 to 500, or 5 to 100, or 10 to 75, or 40 to 60; and each occurrence of Ar is independently an unsubstituted or substituted $C_6$-$C_{30}$ arylene group, wherein aromatic carbon atoms of the arylene group are directly bonded to each adjacent oxygen atom. Ar groups can be derived from a $C_6$-$C_{30}$ dihydroxyarylene compound, for example a dihydroxyarylene compound of formula

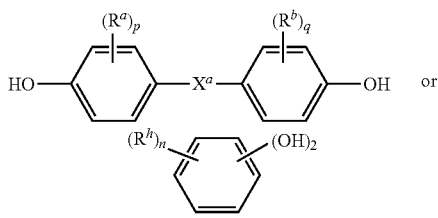

wherein n, p, and q are independently 0, 1, 2, 3, or 4; $R^a$, $R^b$, and $R^h$ are independently at each occurrence halogen, or unsubstituted or substituted $C_{1-10}$ hydrocarbyl; and $X^a$ is a single bond, —O—, —S—, —S(O)—, —S(O)$_2$-, —C(O)—, or a $C_{1-18}$ hydrocarbylene, which can be cyclic or acyclic, aromatic or non-aromatic, and can further comprise one or more heteroatoms selected from halogens, oxygen, nitrogen, sulfur, silicon, or phosphorus. Examples of dihydroxyarylene compounds include hydroquinone, resorcinol, 1,1-bis(4-hydroxyphenyl)methane, 1,1-bis(4-hydroxyphenyl)ethane, 2,2-bis(4-hydroxyphenyl)propane (bisphenol A), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)butane, 2,2-bis(4-hydroxy-1-methylphenyl) propane, 1,1-bis(4-hydroxyphenyl)cyclohexane, bis(4-hydroxyphenyl sulfide), and 1,1-bis(4-hydroxy-t-butylphenyl)propane.

In some embodiments, the polysiloxane block has the formula

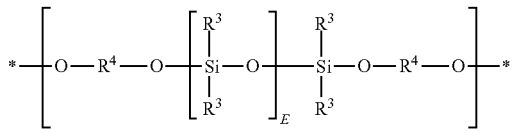

wherein $R^3$ and E are as defined above, and each occurrence of $R^4$ is independently (divalent) $C_1$-$C_{30}$hydrocarbylene.

In a specific embodiment, the polysiloxane block has the formula

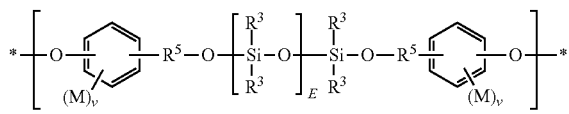

wherein $R^3$ and E are as defined above; each occurrence of $R^5$ is independently a divalent $C_2$-$C_8$ aliphatic group; each occurrence of M is independently halogen, cyano, nitro, $C_1$-$C_8$ alkyl, $C_1$-$C_8$ alkoxyl, $C_1$-$C_8$ alkylthio, $C_2$-$C_8$alkenyl, $C_2$-$C_8$ alkenyloxyl group, $C_6$-$C_{10}$ aryl, $C_6$-$C_{10}$ aryloxyl, $C_7$-$C_{12}$ arylalkyl, $C_7$-$C_{12}$ arylalkoxyl, $C_7$-$C_{12}$alkylaryl, or $C_7$-$C_{12}$ alkylaryloxyl; and each occurrence of v is independently 0, 1, 2, 3, or 4. In some embodiments, at least one occurrence of v is not zero, and each associated occurrence of M is independently chloro, bromo, $C_1$-$C_6$ alkyl (including methyl, ethyl, and n-propyl), $C_1$-$C_6$ alkoxyl (including methoxyl, ethoxyl, and propoxyl), or $C_6$-$C_{12}$ aryl or alkylaryl (including phenyl, chlorophenyl, and tolyl); each occurrence of $R^5$ is independently $C_2$-$C_4$ alkylene (including dimethylene, trimethylene, and tetramethylene); and $R^3$ is $C_1$-$C_8$ alkyl, $C_1$-$C_8$ haloalkyl (including 3,3,3-trifluoropropyl), $C_1$-$C_8$ cyanoalkyl, or $C_6$-$C_{12}$ aryl or alkylaryl (including phenyl, chlorophenyl, and tolyl). In some embodiments, each occurrence of $R^3$ is independently methyl, 3,3,3-trifluoropropyl, or phenyl. In some embodiments, all the occurrences of $R^3$ collective include at least one methyl and at least one 3,3,3-trifluoropropyl. In some embodiments, two occurrences of $R^3$ attached to the same silicon atom are methyl and phenyl. In some embodiments, each occurrence of v is 1, each occurrence of M is methoxyl, $R^5$ is a divalent $C_1$-$C_3$ alkylene group, and each occurrence of $R^3$ is methyl.

In some embodiments, the block polycarbonate-polysiloxane comprises, based on the weight of the block polycarbonate-polysiloxane, 70 to 97 weight percent carbonate units and 3 to 30 weight percent of diorganosiloxane units. Within this range, the block polycarbonate-polysiloxane can comprise 70 to 90 weight percent, or 75 to 85 weight percent, of carbonate units, and 10 to 30 weight percent, or 15 to 25 weight percent of diorganosiloxane units.

In some embodiments, the block polycarbonate-polysiloxane has a weight average molecular weight of 2,000 to 100,000 atomic mass units, specifically 5,000 to 50,000 atomic mass units, as determined by gel permeation chromatography using a crosslinked styrene-divinyl benzene column, a sample concentration of 1 milligram per milliliter, and bisphenol A polycarbonate standards.

In a very specific embodiment, the block polycarbonate-polysiloxane comprises, based on the weight of the block polycarbonate-polysiloxane, 10 to 30 weight percent of dimethylsiloxane units, and 70 to 90 weight percent of carbonate units of the formula

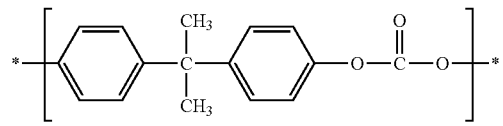

and the block polycarbonate-polysiloxane has a melt volume flow rate of 3 to 20 centimeter³/10 minutes measured at 300° C. and 1.2 kilogram load according to ASTM D1238-04. The carbonate units can be present in a single polycarbonate block, or distributed among multiple polycarbonate blocks. In some embodiments, the carbonate units are distributed among at least two polycarbonate blocks.

In another very specific embodiment, the block polycarbonate-polysiloxane has the formula

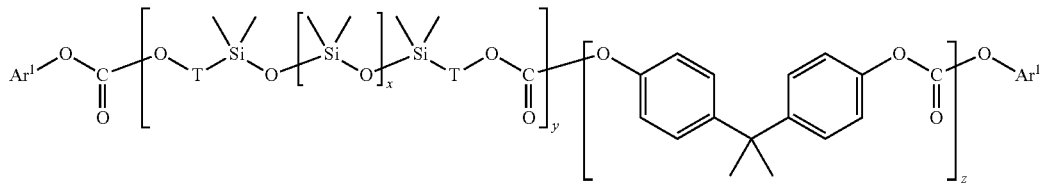

wherein $Ar^1$ is unsubstituted or substituted $C_6$-$C_{18}$ aryl; wherein x, y, and z are such that the block copolymer has 10 to 30 weight percent, specifically 15 to 25 weight percent, of polydimethylsiloxane units. In some embodiments, x is, on average, 30 to 60, specifically 30 to 56; y is on average 1 to 5, specifically 1 to 3; and z is on average 70 to 130, specifically 80 to 100. T is a divalent $C_3$-$C_{30}$ linking group, specifically a hydrocarbyl group which can be aliphatic, aromatic, or a combination of aromatic and aliphatic and can contain one or more heteroatoms including oxygen. A wide variety of linking groups and combinations thereof can be used. The T group can be derived from a eugenol or allyl end-capping agent on the polysiloxane chain. Other end-capping agents, in addition to eugenol, include aliphatically unsaturated monohydric phenols such as 2-allyl phenol and 4-allyl-2-methylphenol. The carbonate units can be present in a single polycarbonate block, or distributed among multiple polycarbonate blocks. In some embodiments, the carbonate units are distributed among at least two polycarbonate block.

In another very specific embodiment, the block polycarbonate-polysiloxane has the formula

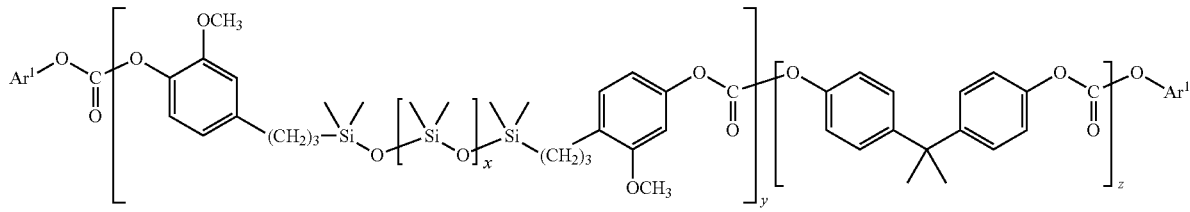

wherein $Ar^1$ is defined as above; and wherein x, y, and z are such that the block copolymer has 10 to 30 weight percent, or 15 to 25 weight percent, of polydimethylsiloxane units. In some embodiments, x is, on average, 30 to 60, or 30 to 56; y is on average 1 to 5, or 1 to 3; and z is on average 70 to 130, or 80 to 100. The carbonate units can be present in a single polycarbonate block, or distributed among multiple polycarbonate blocks. In some embodiments, the carbonate units are distributed among at least two polycarbonate blocks.

Block polycarbonate-polysiloxanes and methods for their preparation are known and described, for example, in U.S. Pat. Nos. 3,419,634 and 3,419,635 to Vaughn, U.S. Pat. No. 3,821,325 to Merritt et al., U.S. Pat. No. 3,832,419 to Merritt, and U.S. Pat. No. 6,072,011 to Hoover.

The composition comprises the block polycarbonate-polysiloxane in an amount of 5 to 15 weight percent, based on the total weight of the composition. Within this range, the block polycarbonate-polysiloxane amount can be 5 to 12 weight percent, or 6 to 12 weight percent.

In addition to the polyetherimide, the block polyestercarbonate, and the block polycarbonate-polysiloxane, the composition comprises a core-shell impact modifier (also referred to herein as a siloxane-acrylic core-shell impact modifier additive). The core-shell impact modifier comprises, based on the weight of the core-shell impact modifier, 60 to 95 weight percent of a core comprising a polysiloxane, and 5 to 40 weight percent of a shell comprising a poly(alkyl (meth)acrylate). Within the range of 60 to 95, the weight percent of core can be 60 to 90, or 65 to 85. Within the range of 5 to 40, the weight percent of shell can be 10 to 40, or 15 to 35. The amount of the core is sometimes referred to herein as the rubber content.

The core of the core-shell impact modifier comprises a polysiloxane. The polysiloxane can be produced by emulsion copolymerization of monomers comprising a source of di-$(C_1$-$C_{12})$-dihydrocarbylsiloxane repeat units. The source of di-$(C_1$-$C_{12})$-dihydrocarbylsiloxane repeat units can comprise, for example, a cyclic dialkylsiloxane such as 1,3,5,7-octamethylcyclotetrasiloxane (D4), a silicon-containing monomer comprising two hydrolyzable groups, such as dimethyldimethoxysilane and/or methylphenyldimethoxysilane, or a combination thereof. In some embodiments, the polysiloxane comprises polydimethylsiloxane. The monomers used to form the polysiloxane can, optionally, include a crosslinking agent, a graftlinking agent, or a combination thereof. The crosslinking agent can comprise a silicon-containing monomer comprising three or more hydrolyzable groups, such as methyltriethoxysilane, tetrapropyloxysilane, or a combination thereof. The graftlinking agent can comprise a silicon-containing monomer comprising at least one more hydrolyzable group, and a polymerizable carbon-carbon double bond. Examples of graftlinking agents include methacryloyloxypropylmethoxydimethylsilane, methacryloyloxypropyldimethoxymethylsilane, vinyldimethoxymethylsilane, vinylphenylmethoxymethylsilane, vinylphenyldimethoxysilane, and combinations thereof.

The core can be produced by known emulsion polymerization methods, including those disclosed in U.S. Pat. No. 2,891,920 to Hyde et al., U.S. Pat. No. 3,294,725 to Findlay et al., U.S. Pat. No. 6,153,694 to Miyatake et al., and U.S. Patent Application Publication No. US 2008/0242797 A1 of Saegusa et al. In some embodiments, the number average particle size of the core is 10 to 1,000 nanometers, or 20 to 500 nanometers, or 20 to 200 nanometers.

The shell of the core-shell impact modifier comprises a poly(alkyl (meth)acrylate). As used herein, the term "(meth) acrylate" means acrylate or methacrylate. In the context of the term "poly(alkyl (meth)acrylate)," the word "alkyl" refers to $C_1$-$C_6$-alkyl. The shell, which is formed in the presence of the core, can be produced by polymerization of monomers comprising a $C_1$-$C_6$-alkyl (meth)acrylate. Suitable $C_1$-$C_6$-alkyl (meth)acrylates include, for example, methyl acrylate, ethyl acrylate, butyl acrylate, methyl methacrylate, ethyl methacrylate, butyl methacrylate, and combinations thereof. In some embodiments, the $C_1$-$C_6$-alkyl (meth)acrylate comprises methyl methacrylate, and the shell comprises poly(methyl methacrylate).

The monomers used to form the shell can, optionally, further comprise a monomer comprising at least two polymerizable carbon-carbon double bonds. Examples of such monomers include allyl acrylate, allyl methacrylate, ethyleneglycol dimethacrylate, 1,3-butyleneglycol dimethacrylate, divinylbenzene, and combinations thereof.

The monomers used to form the shell can, optionally, further comprise a graftlinking monomer to facilitate grafting of the shell to the core. Such monomers include at least one hydrolyzable group bound to a silicon atom, and at least one polymerizable carbon-carbon double bond. Examples include, for example, methacryloyloxypropylmethoxy-dimethylsilane, methacryloyloxypropyldimethoxymethylsilane, vinyldimethoxymethylsilane, vinylphenylmethoxymethylsilane, and vinylphenyldimethoxysilane. In some embodiments, the shell-forming monomers comprise a graftlinking monomer and a monomer comprising at least two polymerizable carbon-carbon double bonds.

Core-shell impact modifiers and methods for their preparation are known and described, for example, in U.S. Pat. No. 6,153,694 to Miyatake et al., and U.S. Patent Application Publication No. US 2008/0242797 A1 of Saegusa et al. Core-shell impact modifiers are also commercially available as, for example, KANE ACE™ MR Series resins from Kaneka.

The composition comprises the core-shell impact modifier in an amount of 1.5 to 7 weight percent, based on the total weight of the composition. Within this range, the core-shell impact modifier amount can be 2 to 7 weight percent, or 2 to 6 weight percent.

The composition minimizes or excludes polystyrene-poly (ethylene-butylene)-polystyrene block copolymers. Specifically, the comprises 0 to 0.8 weight percent of polystyrene-poly(ethylene-butylene)-polystyrene block copolymers. Within this range, the content of polystyrene-poly(ethylene-butylene)-polystyrene block copolymers can be 0 to 0.5 weight percent, or 0 weight percent. Polystyrene-poly(ethylene-butylene)-polystyrene block copolymers are described, for example, in International Patent Application Publication No. WO 2016/164518 A1 of Zhou et al.

The composition can, optionally, comprise a block polyestercarbonate-polysiloxane. A block polyestercarbonate-polysiloxane is a copolymer comprising at least one polyester block, at least one polycarbonate block, and at least one polysiloxane block. Specifically, the block polyestercarbonate-polysiloxane comprises a polyester block comprising resorcinol ester repeat units having the structure

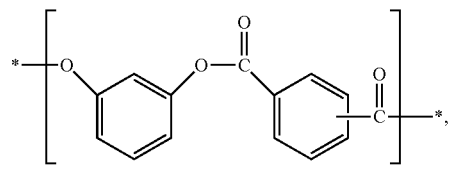

a polycarbonate block comprising carbonate repeat units having the structure

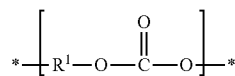

wherein at least 60 percent of the total number of $R^1$ groups are aromatic, and a polysiloxane block comprising dimethylsiloxane repeat units. In some embodiments, the resorcinol ester repeat units comprise resorcinol isophthalate/terephthalate units, the carbonate repeat units comprise resorcinol carbonate units and bisphenol A carbonate units. In a very specific embodiment, the block polyestercarbonate-polysiloxane comprises, based on total moles of carbonate and ester repeat units, 70 to 90 mole percent of resorcinol isophthalate/terephthalate repeat units, 5 to 15 mole percent of resorcinol carbonate repeat units, 5 to 15 mole percent of bisphenol A carbonate repeat units, and further comprises, based on the total weight of the block polyestercarbonate-polysiloxane, 0.2 to 4 weight percent, or 0.4 to 2 weight percent, polydimethylsiloxane.

Methods for the preparation of block polyestercarbonate-polysiloxanes are known and described, for example, in U.S. Pat. No. 7,790,292 B2 to Colborn et al.

When present, the block polyestercarbonate-polysiloxane can be used in an amount of 5 to 30 weight percent, based on the total weight of the composition. Within this range, the block polyestercarbonate-polysiloxane amount can be 10 to 30 weight percent, or 15 to 25 weight percent. In some embodiments in which the block polyestercarbonate-polysiloxane is present, the amount of block polyestercarbonate is 15 to 30 weight percent, based on the total weight of the composition. Within this range, the amount of block polyestercarbonate can be 15 to 25 weight percent.

The composition can, optionally, comprise a block polyetherimide-polysiloxane. A block polyetherimide-polysiloxane is a copolymer comprising at least one polyetherimide block and at least one polysiloxane block. The polyetherimide blocks can comprise repeat units having any of the structures described above for the polyetherimide. The polysiloxane blocks can comprise repeat units having any of the structures described above for the polysiloxane block of the block polycarbonate-polysiloxane. In some embodiments, the polyetherimide block comprises repeat units, each repeat unit independently having the structure

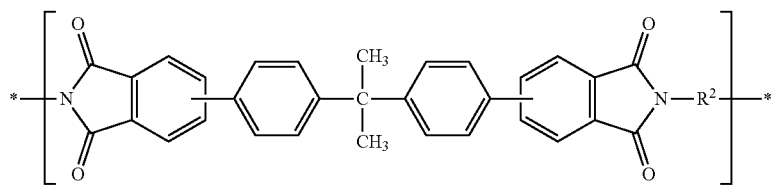

wherein $R^2$ is meta-phenylene or para-phenylene, and the polysiloxane block comprises polydimethylsiloxane repeat units.

Methods for the preparation of block polyetherimide-polysiloxanes are known and described, for example, in U.S. Pat. No. 4,404,350 to Ryang, and U.S. Pat. Nos. 4,808,686 and 4,690,997 to Cella et al.

In some embodiments, the block polyetherimide-polysiloxane is a polyetherimide dimethylsiloxane copolymer.

When present, the block polyetherimide-polysiloxane can be used in an amount of 1 to 10 weight percent, based on the total weight of the composition. Within this range, the block polyetherimide-polysiloxane amount can be 1 to 5 weight percent. In some embodiments, the composition excludes block polyetherimide-polysiloxane.

The composition can, optionally, further comprise a flame retardant. A flame retardant is a chemical compound or mixture of chemical compounds capable of improving the flame retardancy of the composition. Suitable flame retardants include, for example, organophosphate esters, metal dialkylphosphinates, phosphazenes, melamine-containing flame retardants, metal hydroxides, and combinations thereof. When present, the flame retardant can be used in an amount of 0.5 to 10 weight percent, based on the total weight of the composition. In some embodiments, the composition excludes flame retardants. In some embodiments, the composition comprises less than or equal to 1 weight percent of, or excludes, phosphazene flame retardants. In some embodiments, the composition excludes organophosphate esters, metal dialkylphosphinates, phosphazenes, melamine-based flame retardants, and metal hydroxides. It will be understood that the term "flame retardants" does not include block polycarbonate-polysiloxanes, block polyestercarbonate-polysiloxanes, or block polyetherimide-polysiloxanes.

The composition can, optionally, further comprise one or more additives known in the thermoplastics art. For example, the composition can, optionally, further comprise an additive chosen from stabilizers, mold release agents, lubricants, processing aids, drip retardants, nucleating agents, UV blockers, dyes, pigments, antioxidants, antistatic agents, blowing agents, mineral oil, metal deactivators, antiblocking agents, and combinations thereof. When present, such additives are typically used in a total amount of less than or equal to 10 weight percent, or less than or equal to 5 weight percent, or less than or equal to 1 weight percent, based on the total weight of the composition. In some embodiments, the composition comprises a phosphite stabilizer, for example tris(2,4-di-tert-butylphenyl)phosphite, in an amount of 0.025 to 0.5 weight percent, or 0.05 to 0.2 weight percent, based on the total weight of the composition.

In some embodiments, the composition excludes one of, or at least two of, or all of polycarbonates (including polycarbonate homopolymers, as well as polycarbonate copolymers in which each repeat unit comprises a carbonate linkage), polyesters (including polyester homopolymers, as well as polyester copolymers in which each repeat unit comprises an ester linkage), polyestercarbonates comprising ester units comprising a divalent aliphatic group, styrene-acrylonitrile copolymers, and acrylonitrile-butadiene-styrene terpolymers. It will be understood that these optionally excluded polymers are chemically distinct from block polycarbonate-polysiloxanes, block polyestercarbonate-polysiloxanes, and block polyetherimide-polysiloxanes.

In some embodiments, the composition minimizes or excludes halogens. For example, the composition can comprise 0 to 1 weight percent of halogens, or the composition can comprise 0 to 0.1 weight percent of halogens, or the composition can exclude halogens.

In a very specific embodiment, the composition comprises 45 to 55 weight percent of the polyetherimide, 15 to 30 weight percent of the block polyestercarbonate, 6 to 12 weight percent of the block polycarbonate-polysiloxane, and 2 to 6 weight percent of the core-shell impact modifier; and further comprises 10 to 30 weight percent of a block polyestercarbonate-polysiloxane, wherein the block polyestercarbonate-polysiloxane comprises a polyester block comprising resorcinol ester repeat units having the structure

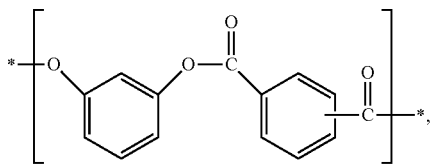

a polycarbonate block comprising carbonate repeat units having the structure

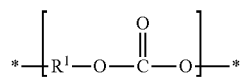

wherein at least 60 percent of the total number of $R^1$ groups are aromatic, and a polysiloxane block comprising dimethylsiloxane repeat units. Optionally within this very specific embodiment, the polyetherimide comprises poly(2,2'-bis(4-(3,4-dicarboxyphenoxy)phenylpropane)-1,3-phenylene bisimide), at least 90 percent of the total number of $R^1$ groups of the polycarbonate block(s) of the block polyestercarbonate are 1,3-phenylene (i.e., the residue of resorcinol) or 2,2-bis(1,4-phenylene)propane (i.e., the residue of bisphenol A), at least 90 percent of the total number of $R^1$ groups of the polycarbonate block(s) of the block polycarbonate-polysiloxane are 1,3-phenylene (i.e., the residue of resorcinol) or 2,2-bis(1,4-phenylene)propane (i.e., the residue of bisphenol A), at least 90 percent of the total number of $R^1$ groups of the polycarbonate block(s) of the block polyestercarbonate-polysiloxane are 1,3-phenylene (i.e., the residue of resorcinol) or 2,2-bis(1,4-phenylene)propane (i.e., the residue of bisphenol A), the polysiloxane block(s) of the block polycarbonate-polysiloxane and the block polyestercarbonate-polysiloxane comprise polydimethylsiloxane, and the poly(alkyl (meth)acrylate) of the core-shell impact modifier comprises poly(methyl methacrylate).

Another embodiment is an article comprising a composition comprising, based on the total weight of the composition: 40 to 60 weight percent of a polyetherimide; 15 to 50 weight percent of a block polyestercarbonate comprising a polyester block comprising resorcinol ester repeat units having the structure

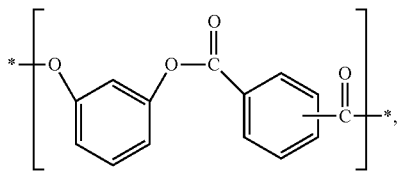

and
a polycarbonate block comprising carbonate repeat units having the structure

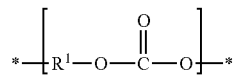

wherein at least 60 percent of the total number of $R^1$ groups are aromatic; 5 to 15 weight percent of a block polycarbonate-polysiloxane; and 1.5 to 7 weight percent of a core-shell impact modifier comprising, based on the weight of the core-shell impact modifier, 60 to 95 weight percent of a core comprising a polysiloxane, and 5 to 40 weight percent of a shell comprising a poly(alkyl (meth)acrylate); wherein the composition comprises 0 to 0.8 weight percent of polystyrene-poly(ethylene-butylene)-polystyrene block copolymers. All of the above-described variants of the composition apply as well to the article comprising the composition.

The composition is useful for forming articles. Suitable article-forming methods include single layer and multilayer sheet extrusion, injection molding, blow molding, film extrusion, profile extrusion, pultrusion, compression molding, thermoforming, pressure forming, hydroforming, vacuum forming, and the like. Combinations of the foregoing article fabrication methods can be used.

In some embodiments, the article is a filament having a diameter of 1 to 5 millimeters. Within this range, the filament diameter can be 1 to 3 millimeters, or 1 to 2 millimeters.

In some embodiments, the article comprises at least two adjacent layers comprising the composition. The article can, optionally, comprise at least five adjacent layers, or at least ten adjacent layers. Within the embodiment of this paragraph, each layer has the same composition. In some embodiments, the article of this paragraph is characterized by mutually orthogonal x, y, and z dimensions, the x, y, and z dimensions independently being 0.5 millimeter to 2 meters. Within this range, the minimum dimension can be 1 millimeter, or 2 millimeters, or 5 millimeters, or 1 centimeter; and the maximum dimensions can be 1 meter, or 50 centimeters.

Another embodiment is a method of additive manufacturing, the method comprising: melt extruding a molten composition to form a plurality of adjacent (and contiguous) layers in a predetermined pattern; wherein the molten composition is characterized by a glass transition temperature; wherein the molten composition has a temperature 5 to 250° C. greater than the glass transition temperature of the molten composition; and wherein the molten composition comprises, based on the total weight of the composition: 40 to 60 weight percent of a polyetherimide; 15 to 50 weight percent of a block polyestercarbonate comprising a polyester block comprising resorcinol ester repeat units having the structure

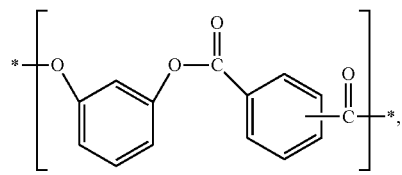

and
a polycarbonate block comprising carbonate repeat units having the structure

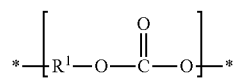

wherein at least 60 percent of the total number of $R^1$ groups are aromatic; 5 to 15 weight percent of a block polycarbonate-polysiloxane; and 1.5 to 7 weight percent of a core-shell impact modifier comprising, based on the weight of the core-shell impact modifier, 60 to 95 weight percent of a core comprising a polysiloxane, and 5 to 40 weight percent of a shell comprising a poly(alkyl (meth)acrylate); wherein the composition comprises 0 to 0.8 weight percent of polystyrene-poly(ethylene-butylene)-polystyrene block copolymers. Within the molten composition temperature range of 5 to 250° C. greater than the glass transition temperature of the molten composition, the lower limit can be 10 or 20° C. greater than the glass transition temperature of the molten composition. Also within the molten composition temperature range of 5 to 250° C. greater than the glass transition temperature of the molten composition, the upper limit can be 200 or 150 or 100° C. greater than the glass transition temperature of the molten composition. All of the above-described variants of the composition apply as well to the method of additive manufacturing.

In some embodiment of the method, the melt extruding comprises melt extruding the molten composition through a nozzle having an internal diameter of 0.2 to 5 millimeters, or 0.2 to 3 millimeters, or 0.2 to 2 millimeters, or 0.2 to 1 millimeter; and wherein the method further comprises forming the molten composition by heating a filament comprising the composition from a temperature at least 20° C. below the glass transition temperature to the temperature 5 to 50° C. greater than the glass transition temperature; and wherein the filament has a diameter of 1 to 5 millimeters, or 1.5 to 4 millimeters.

Another embodiment is a use of a composition as a melt extruded material for additive manufacturing, the composition comprising, based on the total weight of the composition: 40 to 60 weight percent of a polyetherimide; 15 to 50 weight percent of a block polyestercarbonate comprising a polyester block comprising resorcinol ester repeat units having the structure

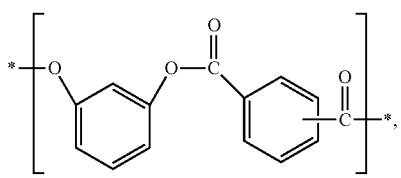

and
a polycarbonate block comprising carbonate repeat units having the structure

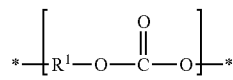

wherein at least 60 percent of the total number of $R^1$ groups are aromatic; 5 to 15 weight percent of a block polycarbonate-polysiloxane; and 1.5 to 7 weight percent of a core-shell impact modifier comprising, based on the weight of the core-shell impact modifier, 60 to 95 weight percent of a core comprising a polysiloxane, and 5 to 40 weight percent of a shell comprising a poly(alkyl (meth)acrylate); wherein the composition comprises 0 to 0.8 weight percent of polystyrene-poly(ethylene-butylene)-polystyrene block copolymers. Within the molten composition temperature range of 5 to 250° C. greater than the glass transition temperature of the molten composition, the lower limit can be 10 or 20° C. greater than the glass transition temperature of the molten composition. Also within the molten composition temperature range of 5 to 250° C. greater than the glass transition temperature of the molten composition, the upper limit can be 200 or 150 or 100° C. greater than the glass transition temperature of the molten composition. All of the above-described variants of the composition apply as well to the use of the composition as a melt extruded material for additive manufacturing.

In some embodiments of the use of the composition as a melt extruded material for additive manufacturing, the composition is characterized by a glass transition temperature; and the use comprises heating a filament comprising the composition from a temperature at least 20° C. below the glass transition temperature to a temperature 5 to 50° C. greater than the glass transition temperature to form a molten composition, wherein the filament has a diameter of 1 to 5 millimeters, and extruding the molten composition to form a plurality of adjacent layers in a predetermined pattern.

The invention includes at least the following embodiments.

Embodiment 1: A composition, comprising, based on the total weight of the composition: 40 to 60 weight percent of a polyetherimide; 15 to 50 weight percent of a block polyestercarbonate comprising a polyester block comprising resorcinol ester repeat units having the structure

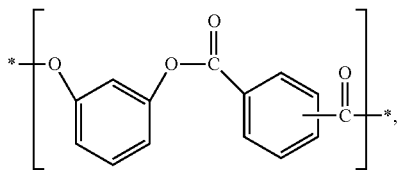

and
a polycarbonate block comprising carbonate repeat units having the structure

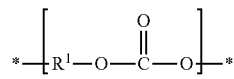

wherein at least 60 percent of the total number of $R^1$ groups are aromatic; 5 to 15 weight percent of a block polycarbonate-polysiloxane; and 1.5 to 7 weight percent of a core-shell impact modifier comprising, based on the weight of the core-shell impact modifier, 60 to 95 weight percent of a core comprising a polysiloxane, and 5 to 40 weight percent of a shell comprising a poly(alkyl (meth)acrylate); wherein the composition comprises 0 to 0.8 weight percent of polystyrene-poly(ethylene-butylene)-polystyrene block copolymers.

Embodiment 2: The composition of embodiment 1, wherein the polysiloxane comprises polydimethylsiloxane.

Embodiment 3: The composition of embodiment 1 or 2, wherein the poly(alkyl (meth)acrylate) comprises poly(m-ethyl methacrylate).

Embodiment 4: The composition of any one of embodiments 1-3, wherein the core-shell impact modifier comprises, based on the weight of the core-shell impact modifier, 65 to 85 weight percent of the core and 15 to 35 weight percent of the shell.

Embodiment 5: The composition of any one of embodiments 1-4, comprising 15 to 30 weight percent of the block polyestercarbonate, and further comprising 10 to 30 weight percent of a block polyestercarbonate-polysiloxane, wherein the block polyestercarbonate-polysiloxane comprises a polyester block comprising resorcinol ester repeat units having the structure

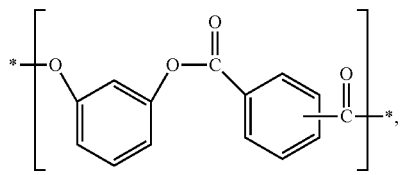

a polycarbonate block comprising carbonate repeat units having the structure

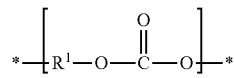

wherein at least 60 percent of the total number of $R^1$ groups are aromatic, and a polysiloxane block comprising dimethylsiloxane repeat units.

Embodiment 6: The composition of any one of embodiments 1-5, further comprising 1 to 10 weight percent of a block polyetherimide-polysiloxane.

Embodiment 7: The composition of any one of embodiments 1-6, comprising 0 to 1 weight percent of phosphazene flame retardants.

Embodiment 8: The composition of any one of embodiments 1-7, excluding organophosphate esters, metal dialkylphosphinates, phosphazenes, melamine-based flame retardants, and metal hydroxides.

Embodiment 9: The composition of embodiment 1, comprising 45 to 55 weight percent of the polyetherimide, 15 to 30 weight percent of the block polyestercarbonate, 6 to 12 weight percent of the block polycarbonate-polysiloxane, and 2 to 6 weight percent of the core-shell impact modifier; and further comprising 10 to 30 weight percent of a block polyestercarbonate-polysiloxane, wherein the block polyestercarbonate-polysiloxane comprises a polyester block comprising resorcinol ester repeat units having the structure

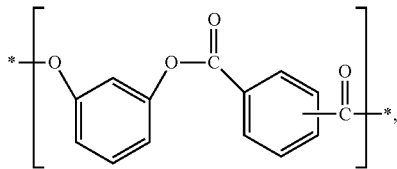

a polycarbonate block comprising carbonate repeat units having the structure

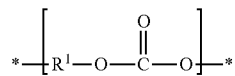

wherein at least 60 percent of the total number of $R^1$ groups are aromatic, and a polysiloxane block comprising dimethylsiloxane repeat units.

Embodiment 10: The composition of embodiment 9, wherein the polyetherimide comprises poly(2,2'-bis(4-(3,4-dicarboxyphenoxy)phenylpropane)-1,3-phenylene bisimide), at least 90 percent of the total number of $R^1$ groups of the polycarbonate block(s) of the block polyestercarbonate are 1,3-phenylene (i.e., the residue of resorcinol) or 2,2-bis(1,4-phenylene)propane (i.e., the residue of bisphenol A), at least 90 percent of the total number of $R^1$ groups of the polycarbonate block(s) of the block polycarbonate-polysiloxane are 1,3-phenylene (i.e., the residue of resorcinol) or 2,2-bis(1,4-phenylene)propane (i.e., the residue of bisphenol A), at least 90 percent of the total number of $R^1$ groups of the polycarbonate block(s) of the block polyestercarbonate-polysiloxane are 1,3-phenylene (i.e., the residue of resorcinol) or 2,2-bis(1,4-phenylene)propane (i.e., the residue of bisphenol A), the polysiloxane block(s) of the block polycarbonate-polysiloxane and the block polyestercarbonate-polysiloxane comprise polydimethylsiloxane, and the poly(alkyl (meth)acrylate) of the core-shell impact modifier comprises poly(methyl methacrylate).

Embodiment 11: An article comprising a composition comprising, based on the total weight of the composition: 40 to 60 weight percent of a polyetherimide; 15 to 50 weight percent of a block polyestercarbonate comprising a polyester block comprising resorcinol ester repeat units having the structure

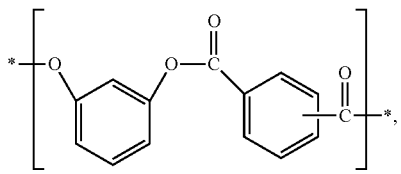

and
a polycarbonate block comprising carbonate repeat units having the structure

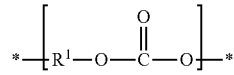

wherein at least 60 percent of the total number of $R^1$ groups are aromatic; 5 to 15 weight percent of a block polycarbonate-polysiloxane; and 1.5 to 7 weight percent of a core-shell impact modifier comprising, based on the weight of the core-shell impact modifier, 60 to 95 weight percent of a core comprising a polysiloxane, and 5 to 40 weight percent of a shell comprising a poly(alkyl (meth)acrylate); wherein the composition comprises 0 to 0.8 weight percent of polystyrene-poly(ethylene-butylene)-polystyrene block copolymers.

Embodiment 12: The article of embodiment 11, wherein the article is a filament having a diameter of 1 to 5 millimeters.

Embodiment 13: The article of embodiment 11, comprising at least two adjacent layers comprising the composition.

Embodiment 14: The article of embodiment 12 or 13, characterized by mutually orthogonal x, y, and z dimensions, the x, y, and z dimensions independently being 0.5 millimeter to 50 centimeters.

Embodiment 15: A method of additive manufacturing, the method comprising: melt extruding a molten composition to form a plurality of adjacent layers in a predetermined pattern; wherein the molten composition is characterized by a glass transition temperature; wherein the molten composition has a temperature 5 to 250° C. greater than the glass transition temperature of the molten composition; and wherein the molten composition comprises, based on the total weight of the composition, 40 to 60 weight percent of a polyetherimide; 15 to 50 weight percent of a block polyestercarbonate comprising a polyester block comprising resorcinol ester repeat units having the structure

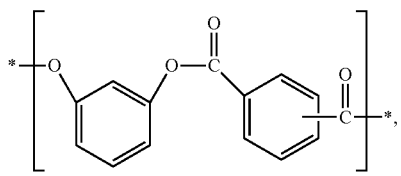

and
a polycarbonate block comprising carbonate repeat units having the structure

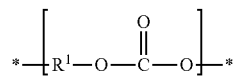

wherein at least 60 percent of the total number of $R^1$ groups are aromatic; 5 to 15 weight percent of a block polycarbonate-polysiloxane; and 1.5 to 7 weight percent of a core-shell impact modifier comprising, based on the weight of the core-shell impact modifier, 60 to 95 weight percent of a core comprising a polysiloxane, and 5 to 40 weight percent of a shell comprising a poly(alkyl (meth)acrylate); wherein the composition comprises 0 to 0.8 weight percent of polystyrene-poly(ethylene-butylene)-polystyrene block copolymers.

Embodiment 16: The method of embodiment 15, wherein the melt extruding comprises melt extruding the molten composition through a nozzle having an internal diameter of 0.2 to 5 millimeters; and wherein the method further comprises forming the molten composition by heating a filament comprising the composition from a temperature at least 20° C. below the glass transition temperature to the temperature 5 to 50° C. greater than the glass transition temperature; and wherein the filament has a diameter of 1 to 5 millimeters.

Embodiment 17: Use of a composition as a melt extruded material for additive manufacturing, the composition comprising, based on the total weight of the composition, 40 to 60 weight percent of a polyetherimide; 15 to 50 weight percent of a block polyestercarbonate comprising a polyester block comprising resorcinol ester repeat units having the structure

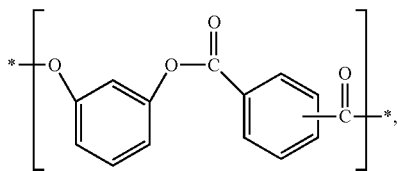

and
a polycarbonate block comprising carbonate repeat units having the structure

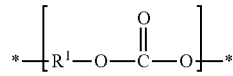

wherein at least 60 percent of the total number of $R^1$ groups are aromatic; 5 to 15 weight percent of a block polycarbonate-polysiloxane; and 1.5 to 7 weight percent of a core-shell impact modifier comprising, based on the weight of the core-shell impact modifier, 60 to 95 weight percent of a core comprising a polysiloxane, and 5 to 40 weight percent of a shell comprising a poly(alkyl (meth)acrylate); wherein the composition comprises 0 to 0.8 weight percent of polystyrene-poly(ethylene-butylene)-polystyrene block copolymers.

Embodiment 18: The use of embodiment 17, wherein the composition is characterized by a glass transition temperature; and wherein the use comprises heating a filament comprising the composition from a temperature at least 20° C. below the glass transition temperature to a temperature 5 to 50° C. greater than the glass transition temperature to form a molten composition, wherein the filament has a diameter of 1 to 5 millimeters, and extruding the molten composition to form a plurality of adjacent layers in a predetermined pattern.

Embodiment 19: A composition, comprising: an amount of a polyetherimide; and a siloxane-acrylic core-shell impact modifier additive present at 1 to 5 wt % as measured against the weight of the composition; the siloxane-acrylic core-shell impact modifier additive having a rubber content of 5 to 100 wt %.

Embodiment 20: The composition of embodiment 19, comprising, based on the total weight of the composition, 48.4 weight percent of the polyetherimide, and 3.0 weight percent of the siloxane-acrylic core-shell impact modifier additive; and further comprising, based on the total weight of the composition, 37.8 weight percent of a polycarbonate-ester polymer, 7.8 weight percent of a polycarbonate-siloxane polymer, 2.9 weight percent of a polyetherimide dimethylsiloxane copolymer, and 0.1 weight percent of tris(2,4-ditert-butylphenyl)phosphite).

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

Example 1

Components used in these examples are summarized in Table 1.

TABLE 1

| Component | Description |
|---|---|
| PEI | Poly [2,2'-bis(4-(3,4-dicarboxyphenoxy)phenylpropane)-1,3-phenylene bisimide], CAS Reg. No. 61128-46-9, having a melt flow rate of about 7 to 11 grams/10 minutes measured at 337° C. and 6.6 kilogram force according to ASTM D1238-13; obtained in pellet form from SABIC as ULTEM 1000 resin. |
| Si-acrylic IM | A core-shell impact modifier having a crosslinked polydimethylsiloxane core and a crosslinked poly(methyl methacrylate) shell having a crosslinked polysiloxane content of about 75-83 weight percent, and a crosslinked poly(methyl methacrylate) content of about 17-25 weight percent, and having a mass median particle size of about 110 micrometers; obtained in powder form from Kaneka as KANE ACE ™ MR01 impact modifier. |
| Silicone beads | Polymethylsilsesquioxane, CAS Reg. No. 68554-70-1, in the form of beads having a number average diameter of about 2 micrometers; obtained from MOMENTIVE as TOSPEARL 120 resin. |
| Silicone gum | Trimethylsiloxy-endcapped poly(dimethylsiloxane-co-vinylmethylsiloxane) (70 weight percent) on fumed silica (30 weight percent); obtained in pellet form from Wacker Chemie AG as GENIOPLAST Pellet S resin. |
| PCE | A p-cumylphenol endcapped block polyestercarbonate with polyester blocks containing 1,3-phenylene isophthalate-co-terephthalate repeat units and carbonate blocks containing bisphenol A carbonate and resorcinol carbonate units, having about 82 mole percent of resorcinol ester (50:50 isophthalate/terephthalate) linkages, about 9 mole percent resorcinol |

TABLE 1-continued

| Component | Description |
|---|---|
| | carbonate linkages, and about 9 mole percent bisphenol A carbonate linkages, and having a weight average molecular weight of about 20,000 grams/mole; preparable according to the procedure of Comparative Example 2-4 of U.S. Pat. No. 7,790,292 B2 to Colborn. |
| PC-siloxane | A p-cumylphenol endcapped block copolymer with polycarbonate blocks containing bisphenol A carbonate repeat units and polysiloxane blocks containing dimethylsiloxane repeat units, the end-capped polydimethylsiloxane macromer having an average of about 45 dimethylsiloxane units per molecule; the copolymer having a weight average molecular weight of 28,000-32,000 grams/mole and a polysiloxane content of about 20 weight percent; preparable according to the procedure of paragraphs [0061] to [0064] of International Patent Application Publication No. WO 2017/019969 Al of Hoover et al. |
| PCE-siloxane | A p-cumylphenol endcapped block polyestercarbonate-polysiloxane with polyester blocks containing 1,3-phenylene isophthalate-co-terephthalate repeat units and carbonate blocks containing bisphenol A carbonate and resorcinol carbonate units and polysiloxane blocks containing dimethylsiloxane repeat units (average siloxane chain length of about 10 per polysiloxane block), having a weight average molecular weight of 22,500 to 26,500 grams/mole, having a bisphenol A carbonate content of about 9 mole percent based on total moles of carbonate and ester repeat units, a resorcinol carbonate content of about 9 mole percent based on total moles of carbonate and ester repeat units, a resorcinol phthalate (50:50 isophthalate/terephthalate) content of about 82 mole percent based on total moles of carbonate and ester repeat units, and a polydimethylsiloxane content of 1 weight percent based on the total weight of the copolymer; preparable according to Example 2-14 of U.S. Pat. No. 7,790,292 B2 to Colborn. |
| PEI-siloxane | Poly(bisphenol A dianhydride-co-1,3-phenylenediamine)-polydimethylsiloxane, formed by imidization of the reaction product of m-phenylenediamine, bisphenol A dianhydride, and a bis-aminopropyl endcapped polydimethylsiloxane having on average about 10 dimethylsiloxane repeat units per molecule; having a polyetherimide content of about 65 weight percent, and a polydimethylsiloxane content of about 35 weight percent; preparable according to the Example 3 synthesis of "random silicone polyimide" in U.S. Pat. No. 4,808,686 to Cella et al. |
| Phosphate FR | Oligomeric phosphate ester flame retardant; obtained in powder form from ICL Industrial Products as FYROLFLEX SOL-DP flame retardant. |
| Phosphazene FR | Hexaphenoxycyclotriphosphazene, CAS Reg. No. 1184-10-7; obtained in granule form from Otsuka Chemical Co., Ltd. as SPB-100. |
| Br-PC | Brominated polycarbonate, prepared by copolymerization of phosgene and a 50:50 weight/weight mixture of 2,2',6,6'-tetrabromo-4,4'-isopropylidenediphenol and bisphenol A, and having a weight average molecular weight of about 22,500 grams/mole; preparable according to the method for forming "TBBPA-BPA Copolymer" in columns 26-27 of U.S. Pat. No. 9,006,324 to Sybert et al. |
| Phosphite stabilizer | Tris(2,4-di-tert-butylphenyl)phosphite, CAS Reg. No. 31570-04-4; obtained from BASF as IRGAFOS 168. |
| Titanium dioxide | Titanium dioxide, CAS Reg. No. 13463-67-7; obtained from CRISTAL as TIONA 189, or from Chemours as Ti-PURE R-105. |

Compositions are summarized in Table 2, where component amounts are expressed in weight percent based on the total weight of the composition.

TABLE 2

| | C. Ex. 1 | Ex. 1 | Ex. 2 | Ex. 3 | Ex. 4 | Ex. 5 | Ex. 6 |
|---|---|---|---|---|---|---|---|
| PEI | 49.9 | 47.4 | 48.4 | 46.9 | 45.9 | 47.9 | 46.9 |
| Si-acrylic IM | 0 | 5 | 3 | 3 | 5 | 3 | 3 |
| Silicone beads | 0 | 0 | 0 | 0 | 0 | 0 | 0 |
| PDMS | 0 | 0 | 0 | 0 | 0 | 0 | 0 |
| PC-siloxane | 8 | 7.6 | 7.8 | 7.5 | 7.4 | 7.7 | 7.5 |
| PCE | 39 | 37.05 | 37.8 | 36.7 | 35.9 | 34.4 | 33.7 |
| PCE-siloxane | 0 | 0 | 0 | 0 | 0 | 0 | 0 |

TABLE 2-continued

|  |  |  |  |  |  |  |  |
|---|---|---|---|---|---|---|---|
| PEI-siloxane | 3.0 | 2.85 | 2.9 | 2.8 | 2.7 | 2.9 | 2.8 |
| Phosphate FR | 0 | 0 | 0 | 3 | 3 | 0 | 0 |
| Phosphazene FR | 0 | 0 | 0 | 0 | 0 | 0 | 0 |
| Br-PC | 0 | 0 | 0 | 0 | 0 | 3 | 3 |
| Phosphite stabilizer | 0.1 | 0.1 | 0.1 | 0.1 | 0.1 | 0.1 | 0.1 |
| Titanium dioxide | 0 | 0 | 0 | 0 | 0 | 1 | 3 |

|  | C. Ex. 2 | Ex. 7 | Ex. 8 | C. Ex. 3 | C. Ex. 4 | C. Ex. 5 |
|---|---|---|---|---|---|---|
| PEI | 54.4 | 49.9 | 49.9 | 47.4 | 47.4 | 48.4 |
| Si-acrylic IM | 3 | 3 | 3 | 0 | 0 | 3 |
| Silicone beads | 0 | 0 | 0 | 0 | 5 | 0 |
| PDMS | 0 | 0 | 0 | 5 | 0 | 0 |
| PC-siloxane | 0 | 8 | 8 | 7.6 | 7.6 | 7.7 |
| PCE | 42.5 | 39 | 19.5 | 37.05 | 37.05 | 37.8 |
| PCE-siloxane | 0 | 0 | 19.5 | 0 | 0 | 0 |
| PEI-siloxane | 0 | 0 | 0 | 2.85 | 2.85 | 0 |
| Phosphate FR | 0 | 0 | 0 | 0 | 0 | 0 |
| Phosphazene FR | 0 | 0 | 0 | 0 | 0 | 3 |
| Br-PC | 0 | 0 | 0 | 0 | 0 | 0 |
| Phosphite stabilizer | 0.1 | 0.1 | 0.1 | 0.1 | 0.1 | 0.1 |
| Titanium dioxide | 0 | 0 | 0 | 0 | 0 | 0 |

Compositions were compounded on a 25 millimeter Werner-Pfleiderer ZAK twin-screw extruder having a length to diameter ratio of 33:1 and a vacuum port located upstream of the die face, and operating at barrel temperatures of 280-295° C./280-295° C./285-300° C./290-305° C./295-310° C./300-315° C./305-320° C. from feed throat to die, a die temperature of 305-320° C., and a throughput of 15-25 kilograms/hour. All components were added at the feed throat. The extrudate was cooled in a water bath, then pelletized. Pellets were dried in a vacuum oven at 135° C. for at least 4 hours before use.

Table 3 presents melt flow rate (MFR) values and glass transition temperature ($T_g$) values for the experimental compositions. MFR values, expressed in grams per 10 minutes, were determined according to ASTM D1238-13 at a temperature of 295° C. and a load of 6.6 kilograms. $T_g$ values were determined by differential scanning calorimetry using a range of 40 to 400° C. and a heating rate of 20° C./minute. Comparison of Comparative Example 1 (lacking siloxane-acrylic core-shell impact modifier) with Example 1 (containing 5 weight percent siloxane-acrylic core-shell impact modifier, with amounts of other components being reduced proportionally) and Example 2 (containing 3 weight percent siloxane-acrylic core-shell impact modifier, with amounts of other components being reduced proportionally) shows that addition of 3 or 5 weight percent siloxane-acrylic core-shell impact modifier has little or no effect on the melt flow rate and the glass transition temperature of the composition. Comparison of Examples 1 and 2 (with no phosphate ester flame retardant) with corresponding Examples 4 and 3 (with 3 weight percent phosphate ester flame retardant), shows that addition of 3 weight percent phosphate ester flame retardant significantly increases the melt flow rate and significantly decreases the glass transition temperature. Comparison of Example 2 and Comparative Example 5 shows that addition of 3 weight percent phosphazene flame retardant is associated with a smaller increase in melt flow and a smaller decrease in glass transition temperature, relative to changes associated with addition of 3 weight percent phosphate ester flame retardant. All other formulations (Examples 5-8 and Comparative Examples 2-4) show little or no effect on melt flow rate and glass transition temperature compared to Comparative Example 1. Only Examples 3 and 4, and Comparative Example 5 with phosphate ester or phosphazene flame retardants significantly affect MFR and $T_g$ values.

TABLE 3

|  | C. Ex. 1 | Ex. 1 | Ex. 2 | Ex. 3 | Ex. 4 | Ex. 5 | Ex. 6 |
|---|---|---|---|---|---|---|---|
| MFR at 295° C., 6.6 kg (g/10 Min) | 8 | 6 | 7 | 13 | 12 | 6 | 6 |
| Tg (° C.) | 181 | 182 | 182 | 167 | 167 | 183 | 183 |

|  | C. Ex. 2 | Ex. 7 | Ex. 8 | C. Ex. 3 | C. Ex. 4 | C. Ex. 5 |
|---|---|---|---|---|---|---|
| MFR at 295° C., 6.6 kg (g/10 Min) | 8 | 6 | 6 | 8 | 7 | 11 |
| Tg (° C.) | 180 | 182 | 182 | 182 | 181 | 174 |

The compositions were used to injection mold test articles for tensile modulus and tensile strength at break and tensile elongation, each measured according to ASTM D638-14, and notched Izod impact strength, measured according to ASTM D256-10e1. Injection molding utilized a Sumitomo 180-ton DEMAG™ molding machine operating at a barrel temperature of 300-330° C., a mold temperature of 110-140° C., a screw speed of 40-70 rotations per minute, a back pressure of 0.3-0.7 megapascals, and a shot to cylinder size of 40-60%. The results, presented in Table 4, show that Examples 1-8, containing core-shell impact modifier, exhibit notched Izod impact strength values at least three times greater than that of Comparative Example 1 without core-shell impact modifier. The results also show that impact-modified Examples 1-8 exhibit tensile strength values comparable to or greater than that of Comparative Example 1 without impact modifier.

TABLE 4

|  | C. Ex. 1 | Ex. 1 | Ex. 2 | Ex. 3 | Ex. 4 |
| --- | --- | --- | --- | --- | --- |
| Notched Izod Impact Strength (J/m) | 115 | 563 | 560 | 586 | 586 |
| Tensile Modulus (MPa) | 3440 | 2394 | 2762 | 2792 | 2666 |
| Tensile Strength at Break (MPa) | 74 | 73 | 85 | 86 | 86 |
| Tensile Elongation at Break (%) | 71 | 104 | 99 | 103 | 110 |

|  | Ex. 5 | Ex. 6 | C. Ex. 2 | Ex. 7 | Ex. 8 |
| --- | --- | --- | --- | --- | --- |
| Notched Izod Impact Strength (J/m) | 533 | 496 | 199 | 538 | 602 |
| Tensile Modulus (MPa) | 2604 | 2578 | 2684 | 2554 | 2562 |
| Tensile Strength at Break (MPa) | 82 | 82 | 81 | 81 | 85 |
| Tensile Elongation at Break (%) | 86 | 95 | 82 | 91 | 97 |

|  | C. Ex. 3 | C. Ex. 4 | C. Ex. 5 |
| --- | --- | --- | --- |
| Notched Izod Impact Strength (J/m) | 174 | 217 | 159 |
| Tensile Modulus (MPa) | 2556 | 2674 | 2616 |
| Tensile Strength at Break (MPa) | 67 | 63 | 72 |
| Tensile Elongation at Break (%) | 43 | 8 | 73 |

For the Example 1-8 and Comparative Example 2-5 compositions, monofilaments were prepared using a Fiber Extrusion Technology FET extrusion machine. Extrusion conditions were optimized based on the glass transition temperature of the resin composition. The resulting filaments had a diameter of about 1.79 millimeters. For the Comparative Example 1 composition, a corresponding monofilament was obtained from Stratasys as ULTEM 9085 filament ("ULTEM" is a trademark of SABIC).

Monofilaments were used to print by an FFF process on a STRATASYS FORTUS™ 900 mc 3D Printer using a model temperature of 375-385° C., an oven temperature of about 185° C., a tip size of 0.406 millimeter (0.016 inch; T16), a layer thickness (resolution) of 0.254 millimeter (0.010 inch; T16), a contour and raster width of 0.508 millimeter (0.020 inch), a precision of the greater of +/−0.13 millimeter (+/−0.005 inch) or +/−0.0015 millimeter/millimeter (+/−0.0015 inch/inch), a speed of about 305 meters/second (12 inches/second), and an air gap of from −0.0254 millimeter (−0.0010 inch) to 0.0000 millimeter (0.0000 inch).

For each composition, the printed ASTM tensile and Izod bars with three different sample orientations, which are illustrated in FIG. 1 and named relative to the Z-direction: the orientation labeled 1 has an XZ orientation and is named "upright"; and the orientation labeled 2 has a YZ orientation and is named "on-edge"; and the orientation labeled 3 has an XY orientation and is named "flat". Tensile properties were determined according to ASTM D638-14. Notched Izod impact strength was determined according to ASTM D256-10e1 with a pendulum energy of 2.71 joules (2 foot-pounds) at 23° C. Results are presented in Table 5, where the reported averages and standard deviations reflect the testing of five samples for each combination of composition and sample orientation. The results show that impact-modified Examples 1-6 and 8 show substantial increases in flat and on-edge notched Izod impact strength relative to corresponding values for Comparative Example 1. The impact strength was not improved in the upright direction. Without being bound by any particular theory, the inventors speculate that this may be because this property is dependent not only on the material, but also on the adhesion between the layers, and failure will occur at the weakest layer interface. The tensile strength and tensile modulus values for Examples 1-6 and 8 decreased slightly compared to those for Comparative Example 1, as expected with additional impact modifier and as observed in the Table 4 results for injection molded test parts.

TABLE 5

|  | C. Ex. 1 | | | Ex. 1 | | | Ex. 2 | | |
| --- | --- | --- | --- | --- | --- | --- | --- | --- | --- |
|  | Flat | On-edge | Upright | Flat | On-edge | Upright | Flat | On-edge | Upright |
| Notched Izod, average (J/m) | 63 | 79 | 35 | 202 | 234 | 25 | 214 | 334 | 13 |
| Std. dev. (J/m) | 17 | 8 | 6 | 4 | 12 | 3 | 22 | 37 | 2 |
| Tensile modulus, average (MPa) | 2100 | 2490 | 2312 | 1702 | 2216 | 2104 | 1856 | 2278 | 1926 |
| Std. dev. (MPa) | 51 | 25 | 247 | 43 | 40 | 154 | 49 | 48 | 59 |
| Tensile strength at break, average (MPa) | 55 | 77 | 38 | 43 | 56 | 31 | 42 | 55 | 22 |
| Std. dev. (MPa) | 1 | 2 | 5 | 2 | 1 | 2 | 1 | 1 | 3 |
| Tensile elongation at break, average (%) | 4.5 | 5.5 | 2.0 | 4.1 | 4.7 | 1.8 | 3.8 | 4.5 | 1.2 |
| Std. dev. (MPa) | 0.4 | 0.1 | 0.3 | 0.3 | 0.2 | 0.1 | 0.2 | 0.3 | 0.2 |

TABLE 5-continued

|  | Ex. 3 | | | Ex. 4 | | | Ex. 5 | | |
| --- | --- | --- | --- | --- | --- | --- | --- | --- | --- |
|  | Flat | On-edge | Upright | Flat | On-edge | Upright | Flat | On-edge | Upright |
| Notched Izod, average (J/m) | 174 | 173 | 12 | 172 | 199 | 21 | 244 | 361 | 8 |
| Std. dev. (J/m) | 13 | 29 | 1 | 11 | 16 | 3 | 15 | 40 | 2 |
| Tensile modulus, average (MPa) | 2030 | 2390 | 2120 | 1960 | 2294 | 1880 | 1458 | 2020 | 1752 |
| Std. dev. (MPa) | 29 | 70 | 154 | 29 | 26 | 494 | 48 | 48 | 86 |
| Tensile strength at break, average (MPa) | 48 | 59 | 24 | 46 | 58 | 29 | 34 | 50 | 21 |
| Std. dev. (MPa) | 1 | 1 | 4 | 1 | 1 | 1 | 2 | 1 | 6 |
| Tensile elongation at break, average (%) | 3.8 | 4.2 | 1.2 | 3.7 | 4.4 | 1.5 | 3.8 | 4.8 | 1.3 |
| Std. dev. (MPa) | 0.3 | 0.2 | 0.3 | 0.3 | 0.1 | 0.1 | 0.5 | 0.2 | 0.4 |

|  | Ex. 6 | | | Ex. 8 | | |
| --- | --- | --- | --- | --- | --- | --- |
|  | Flat | On-edge | Upright | Flat | On-edge | Upright |
| Notched Izod, average (J/m) | 218 | 333 | 14 | 204 | 258 | 22 |
| Std. dev. (J/m) | 16 | 9 | 6 | 8 | 9 | 2 |
| Tensile modulus, average (MPa) | 1504 | 2056 | 1836 | 1462 | 2062 | 1830 |
| Std. dev. (MPa) | 44 | 29 | 48 | 58 | 55 | 195 |
| Tensile strength at break, average (MPa) | 34 | 49 | 23 | 36 | 52 | 32 |
| Std. dev. (MPa) | 1 | 1 | 4 | 2 | 1 | 1 |
| Tensile elongation at break, average (%) | 3.7 | 4.6 | 1.3 | 3.8 | 5.7 | 2.1 |
| Std. dev. (MPa) | 0.1 | 0.1 | 0.2 | 0.4 | 0.4 | 0.1 |

Flammability testing was conducted according to the protocol of Section 25.853 of Part 25 of the U.S. Federal Aviation Regulations, as further described in U.S. Federal Aviation Administration Advisory Circular 25.853-1 ("Flammability Requirements for Aircraft Seat Cushions", issued 17 Sep. 1986). The testing was conducted by Herb Curry, Inc., Mount Vernon, Ind., USA. Testing was conducted for test articles prepared from the Example 1-10 and 13-15 compositions. The results in Table 6 are averages and standard deviations derived from the testing of three samples per composition. In Table 6, the "Limits" of "55/55" mean that to pass the test, each sample must exhibit an average Two Minute Integrated Heat Release Rate of 55 kW-min/m$^2$ or less, and an average Peak Heat Release of 55 kW/m$^2$ or less. The "Limits" of "65/65" mean that to pass the test, each sample must exhibit an average Two Minute Integrated Heat Release Rate of 65 kW-min/m$^2$ or less, and an average Peak Heat Release of 65 kW/m$^2$ or less. The results show that Comparative Examples 1 and 2, and Examples 1, 2, 5, and 6 were able to pass under both the 55/55 and 65/65 limits, while Examples 3 and 4 with phosphate ester flame retardant passed only under the 65/65 limits, and Comparative Example 5 with phosphazene flame retardant failed under both the 55/55 and 65/65 limits.

TABLE 6

|  | C. Ex. 1 | Ex. 1 | Ex. 2 | Ex. 3 | Ex. 4 | Ex. 5 |
| --- | --- | --- | --- | --- | --- | --- |
| Two Minute Integrated Heat Release Rate, average (kW-min/m$^2$) | 14 | 32.3 | 46 | 34 | 54 | 30 |
| Std. dev. (kW-min/m$^2$) | 4.6 | 3.8 | 6.0 | 2.0 | 0.6 | 5.9 |
| Peak Heat Release, average (kW/m$^2$) | 44 | 53 | 54 | 60 | 59 | 49 |
| Std. Dev. (kW/m$^2$) | 1.0 | 3.6 | 2.5 | 4.0 | 5.0 | 3.0 |
| 55/55 Limits, Pass/Fail | Pass | Pass | Pass | Fail | Fail | Pass |
| 65/65 Limits, Pass/Fail | Pass | Pass | Pass | Pass | Pass | Pass |

|  | Ex. 6 | C. Ex. 2 | Ex. 7 | Ex. 8 | C. Ex. 5 |
| --- | --- | --- | --- | --- | --- |
| Two Minute Integrated Heat Release Rate, average (kW-min/m$^2$) | 34 | 43 | 32 | 35 | 33 |
| Std. dev. (kW-min/m$^2$) | 2.1 | 5.7 | 2.6 | 2.1 | 2.5 |
| Peak Heat Release, average (kW/m$^2$) | 54 | 52 | 53.7 | 47 | 75 |
| Std. Dev. (kW/m$^2$) | 2.1 | 2.1 | 12.4 | 4.5 | 4.6 |

TABLE 6-continued

| | | | | | |
|---|---|---|---|---|---|
| 55/55 Limits, Pass/Fail | Pass | Pass | Pass | Pass | Fail |
| 65/65 Limits, Pass/Fail | Pass | Pass | Pass | Pass | Fail |

Figure 2:
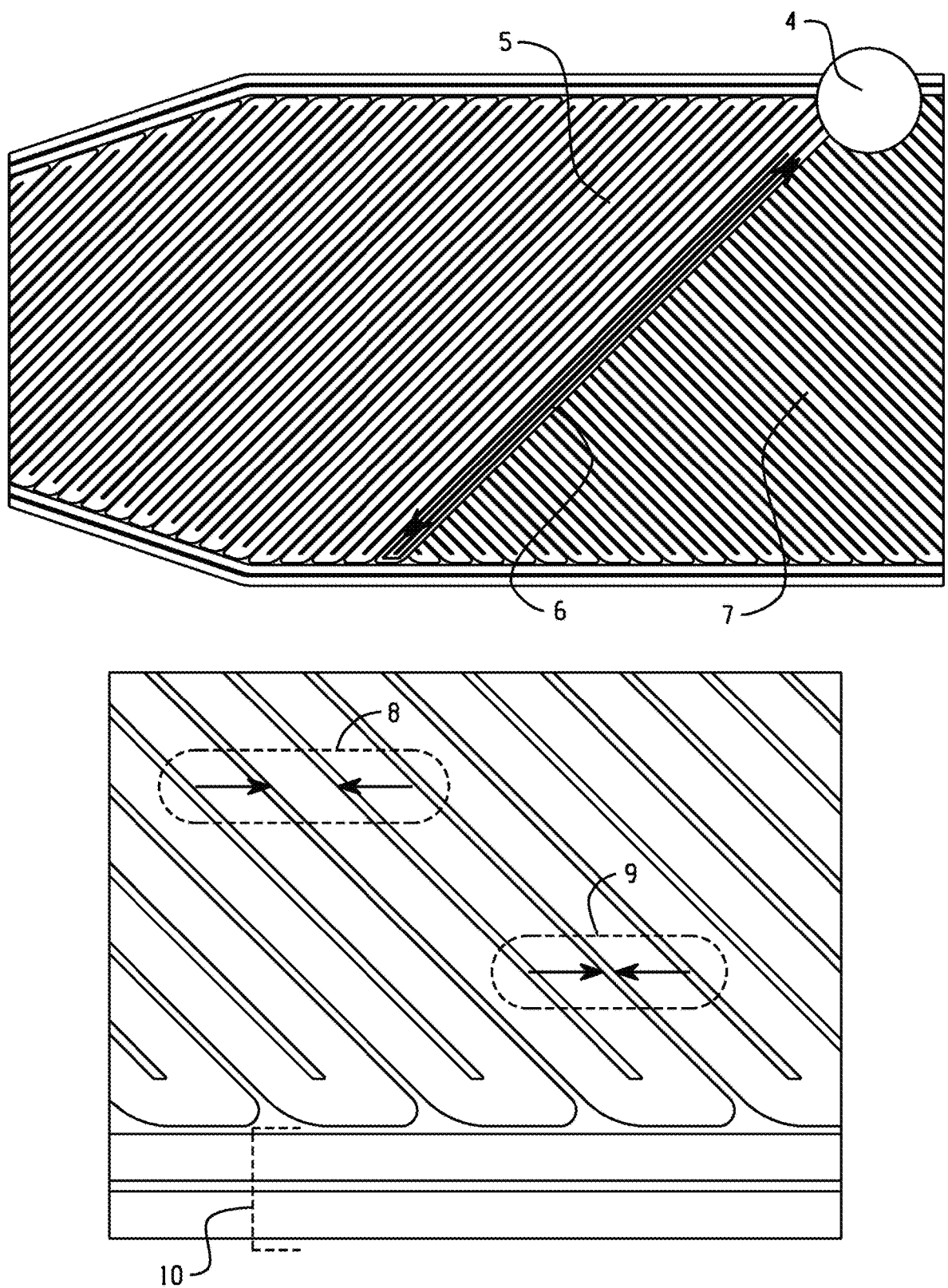
FIG. 2 is a diagram of a filament (raster) fill pattern for one layer of a part made by a filament-based additive manufacturing process.

FIG. 2 is a prophetic illustration of a filament (raster) fill pattern for a part layer made by a filament-based additive manufacturing process; this pattern may apply to any print orientation. The features labeled in FIG. 2 ("First layer", "Second layer", "Direction of print head movement", "Filament (raster) width", "Raster to raster air gap") are known to those of skill in the additive manufacturing art.

In FIG. 2, layer thickness (not labeled) is the thickness of the layer deposited by the nozzle. Raster angle (not labeled) is the direction of raster with respect to the loading direction of stress. Raster-to-raster air gap, 9, is the distance between two adjacent deposited filaments in the same layer. The perimeter (contours), 10, is the number of filaments deposited along the outer edge of a part. Filament (raster) width, 8, is the width of the filament deposited by the nozzle. The printhead, 4, can operate to change its angle of travel with each successive layer, e.g., by 90 degrees with each successive layer. For example, the direction of printhead movement, 6, for the second layer, 5, defines an angle of travel (unlabeled) that is 90 degrees different from the angle used when forming the first layer, 7.

Table 7, below, provides results of notched Izod impact strength tested after printing the Comparative Example 1 and Example 1 compositions on a MAKERBOT™ Replicator 2× desktop printer producing successive layers using a 90 degree alternating angle of travel, similar to the flat orientation of the above-described parts printed with the FORTUS™ 900 mc 3D Printer, with nozzle and bed temperatures shown in Table 7, layer resolution 100 micrometers (0.0039 inch), nozzle/tip diameter 0.4 millimeter (0.015 inch), layer thickness 0.2 millimeter, print speed 90 millimeters/second. The results in Table 7 show that the Example 1 part had better impact strength than the Comparative Example 1 part, even after printing at a lower nozzle temperature (350° C. for Comparative Example 1 versus 332° C. for Example 1). The impact strength improvement of the Example 1 part relative to the Comparative Example 1 part was less for the MAKERBOT™ Replicator 2×-printed parts than for the STRATASYS FORTUS™ 900 mc-printed parts (see Table 5). Without being bound by any particular theory, the inventors speculate that this may be due to differences in the machine parameters and heat distribution.

TABLE 7

| | C. Ex. 1 | Ex. 1 |
|---|---|---|
| Nozzle temp. (° C.) | 350 | 332 |
| Bed temp. (° C.) | 230 | 232 |
| Notched Izod (J/m) | 146 | 257 |

As shown above, for a given print orientation (e.g., flat, on-edge), a composition comprising polyetherimide, block polyestercarbonate, and a core-shell impact modifier can exhibit a notched Izod impact strength value that is from about 2 to about 5 times the corresponding value for a composition without the core-shell impact modifier. The addition of core-shell impact modifier is also associated with improvements in tensile modulus and/or tensile strength at break.

The invention claimed is:

1. A composition comprising, based on the total weight of the composition:
   40 to 60 weight percent of a polyetherimide;
   15 to 50 weight percent of a block polyestercarbonate comprising
      a polyester block comprising resorcinol ester repeat units having the structure

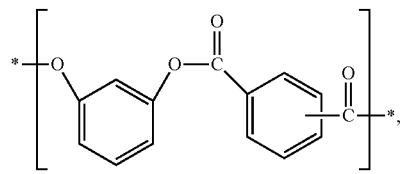

and
   a polycarbonate block comprising carbonate repeat units having the structure

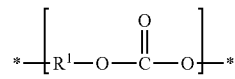

wherein at least 60 percent of the total number of $R^1$ groups are aromatic;
   5 to 15 weight percent of a block polycarbonate-polysiloxane; and
   1.5 to 7 weight percent of a core-shell impact modifier comprising, based on the weight of the core-shell impact modifier,
      60 to 95 weight percent of a core comprising a polysiloxane, and
      5 to 40 weight percent of a shell comprising a poly (alkyl (meth)acrylate);
   wherein the composition comprises 0 to 0.8 weight percent of polystyrene-poly(ethylene-butylene)-polystyrene block copolymers.

2. The composition of claim 1, wherein the polysiloxane comprises polydimethylsiloxane.

3. The composition of claim 1, wherein the poly(alkyl (meth)acrylate) comprises poly(methyl methacrylate).

4. The composition of claim 1, wherein the core-shell impact modifier comprises, based on the weight of the core-shell impact modifier, 65 to 85 weight percent of the core and 15 to 35 weight percent of the shell.

5. The composition of claim 1, comprising 15 to 30 weight percent of the block polyestercarbonate, and further comprising 10 to 30 weight percent of a block polyestercarbonate-polysiloxane, wherein the block polyestercarbonate-polysiloxane comprises
   a polyester block comprising resorcinol ester repeat units having the structure

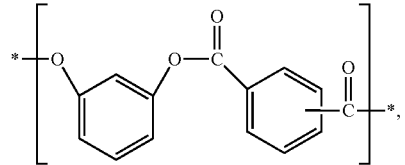

a polycarbonate block comprising carbonate repeat units having the structure

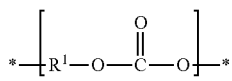

wherein at least 60 percent of the total number of $R^1$ groups are aromatic, and
a polysiloxane block comprising dimethylsiloxane repeat units.

6. The composition of claim 1, further comprising 1 to 10 weight percent of a block polyetherimide-polysiloxane.

7. The composition of claim 1, comprising 0 to 1 weight percent of phosphazene flame retardants.

8. The composition of claim 1, excluding organophosphate esters, metal dialkylphosphinates, phosphazenes, melamine-based flame retardants, and metal hydroxides.

9. The composition of claim 1,
comprising
45 to 55 weight percent of the polyetherimide,
15 to 30 weight percent of the block polyestercarbonate,
6 to 12 weight percent of the block polycarbonate-polysiloxane, and
2 to 6 weight percent of the core-shell impact modifier; and
further comprising
10 to 30 weight percent of a block polyestercarbonate-polysiloxane, wherein the block polyestercarbonate-polysiloxane comprises
a polyester block comprising resorcinol ester repeat units having the structure

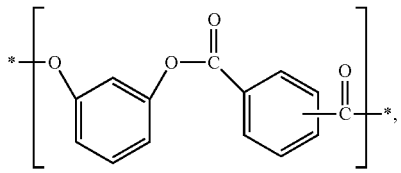

a polycarbonate block comprising carbonate repeat units having the structure

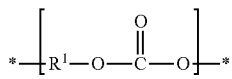

wherein at least 60 percent of the total number of $R^1$ groups are aromatic, and
a polysiloxane block comprising dimethylsiloxane repeat units.

10. The composition of claim 9, wherein
the polyetherimide comprises poly(2,2'-bis(4-(3,4-dicarboxyphenoxy)phenylpropane)-1,3-phenylene bisimide),
at least 90 percent of the total number of $R^1$ groups of the polycarbonate block(s) of the block polyestercarbonate are 1,3-phenylene or 2,2-bis(1,4-phenylene)propane,
at least 90 percent of the total number of $R^1$ groups of the polycarbonate block(s) of the block polycarbonate-polysiloxane are 1,3-phenylene or 2,2-bis(1,4-phenylene)propane, at least 90 percent of the total number of $R^1$ groups of the polycarbonate block(s) of the block polyestercarbonate-polysiloxane are 1,3-phenylene or 2,2-bis(1,4-phenylene)propane,
the polysiloxane block(s) of the block polycarbonate-polysiloxane and the block polyestercarbonate-polysiloxane comprise polydimethylsiloxane, and
the poly(alkyl (meth)acrylate) of the core-shell impact modifier comprises poly(methyl methacrylate).

11. An article comprising a composition comprising, based on the total weight of the composition:
40 to 60 weight percent of a polyetherimide;
15 to 50 weight percent of a block polyestercarbonate comprising
a polyester block comprising resorcinol ester repeat units having the structure

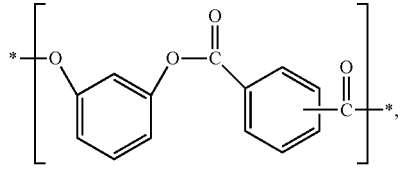

and
a polycarbonate block comprising carbonate repeat units having the structure

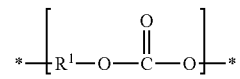

wherein at least 60 percent of the total number of $R^1$ groups are aromatic;
5 to 15 weight percent of a block polycarbonate-polysiloxane; and
1.5 to 7 weight percent of a core-shell impact modifier comprising, based on the weight of the core-shell impact modifier,
60 to 95 weight percent of a core comprising a polysiloxane, and
5 to 40 weight percent of a shell comprising a poly(alkyl (meth)acrylate);
wherein the composition comprises 0 to 0.8 weight percent of polystyrene-poly(ethylene-butylene)-polystyrene block copolymers.

12. The article of claim 11, wherein the article is a filament having a diameter of 1 to 5 millimeters.

13. The article of claim 11, comprising at least two adjacent layers comprising the composition.

14. The article of claim 13, characterized by mutually orthogonal x, y, and z dimensions, the x, y, and z dimensions independently being 0.5 millimeter to 50 centimeters.

15. A method of additive manufacturing, the method comprising:
melt extruding a molten composition to form a plurality of adjacent layers in a predetermined pattern;
wherein the molten composition is characterized by a glass transition temperature;
wherein the molten composition has a temperature 5 to 250° C. greater than the glass transition temperature of the molten composition; and
wherein the molten composition comprises, based on the total weight of the composition, 40 to 60 weight percent of a polyetherimide;
15 to 50 weight percent of a block polyestercarbonate comprising
  a polyester block comprising resorcinol ester repeat units having the structure

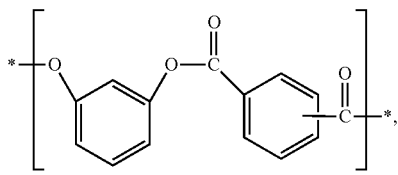

and
  a polycarbonate block comprising carbonate repeat units having the structure

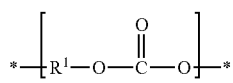

wherein at least 60 percent of the total number of $R^1$ groups are aromatic;
5 to 15 weight percent of a block polycarbonate-polysiloxane; and
1.5 to 7 weight percent of a core-shell impact modifier comprising, based on the weight of the core-shell impact modifier,
  60 to 95 weight percent of a core comprising a polysiloxane, and
  5 to 40 weight percent of a shell comprising a poly(alkyl (meth)acrylate);
wherein the composition comprises 0 to 0.8 weight percent of polystyrene-poly(ethylene-butylene)-polystyrene block copolymers.

16. The method of claim 15,
wherein the melt extruding comprises melt extruding the molten composition through a nozzle having an internal diameter of 0.2 to 5 millimeters; and
wherein the method further comprises forming the molten composition by heating a filament comprising the composition from a temperature at least 20° C. below the glass transition temperature to the temperature 5 to 50° C. greater than the glass transition temperature; and
wherein the filament has a diameter of 1 to 5 millimeters.

17. The composition of claim 2, wherein the poly(alkyl (meth)acrylate) comprises poly(methyl methacrylate).

18. The composition of claim 2, wherein the core-shell impact modifier comprises, based on the weight of the core-shell impact modifier, 65 to 85 weight percent of the core and 15 to 35 weight percent of the shell.

19. The composition of claim 3, wherein the core-shell impact modifier comprises, based on the weight of the core-shell impact modifier, 65 to 85 weight percent of the core and 15 to 35 weight percent of the shell.

20. The composition of claim 4, comprising 15 to 30 weight percent of the block polyestercarbonate, and further comprising 10 to 30 weight percent of a block polyestercarbonate-polysiloxane, wherein the block polyestercarbonate-polysiloxane comprises
  a polyester block comprising resorcinol ester repeat units having the structure

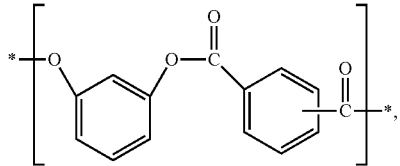

a polycarbonate block comprising carbonate repeat units having the structure

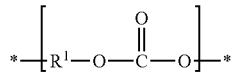

wherein at least 60 percent of the total number of $R^1$ groups are aromatic, and
a polysiloxane block comprising dimethylsiloxane repeat units.

* * * * *